United States Patent
Mori et al.

(10) Patent No.: US 8,415,938 B2
(45) Date of Patent: Apr. 9, 2013

(54) SWITCHING REGULATOR

(75) Inventors: Ibuki Mori, Tokyo (JP); Yoshihisa Yamada, Kiryu (JP); Masashi Kono, Higashimurayama (JP); Haruo Kobayashi, Kiryu (JP); Toshio Sugiyama, Tokyo (JP)

(73) Assignees: National University Corporation Gunma University, Gunma (JP); Asahi Kasei Microdevices Corporation, Tokyo (JP)

( * ) Notice: Subject to any disclaimer, the term of this patent is extended or adjusted under 35 U.S.C. 154(b) by 0 days.

(21) Appl. No.: 12/936,119

(22) PCT Filed: Mar. 27, 2009

(86) PCT No.: PCT/JP2009/056294
§ 371 (c)(1),
(2), (4) Date: Dec. 17, 2010

(87) PCT Pub. No.: WO2009/123054
PCT Pub. Date: Oct. 8, 2009

(65) Prior Publication Data
US 2011/0095740 A1    Apr. 28, 2011

(30) Foreign Application Priority Data

Apr. 2, 2008    (JP) ................................. 2008-096079

(51) Int. Cl.
*G05F 1/00* (2006.01)
(52) U.S. Cl. ........................................ 323/282; 323/271
(58) Field of Classification Search .................. 323/222, 323/225, 268, 271, 282–285
See application file for complete search history.

(56) References Cited

U.S. PATENT DOCUMENTS 5,510,698 A * 4/1996 Stankovic et al. ............ 323/282
5,869,955 A * 2/1999 Henseler ....................... 323/287
(Continued)

FOREIGN PATENT DOCUMENTS

JP    11-32488      2/1999
JP    11-266579     9/1999
(Continued)

OTHER PUBLICATIONS

Tanaka, Tetsuro, et al., "On the Low-Frequencey Output Noise of a DC-to-DC Converter with Random-Switching Control", B vol. J83-B No. 9, pp. 1335-1341, 2000.

*Primary Examiner* — Timothy J Dole
*Assistant Examiner* — Yusef Ahmed
(74) *Attorney, Agent, or Firm* — Morgan, Lewis & Bockius LLP

(57) ABSTRACT

The invention provides a technique to widely spread the frequency spectrum of switching noise generated by a switching action and to reduce the noise level at a particular frequency. A switching regulator (6A) includes a computing unit with computing function. First, in the computing unit, a pulse-width-modulation processing unit (PWM) (2a) performs pulse-width-modulation processing of receiving a feedback signal corresponding to the output of a detector 1 to determine an on-duty cycle of a pulse signal. Subsequently, for the signal and data obtained by the PWM (2a) to be subjected to further modulation processing for spectrum spreading, a branching processing is performed by making changing-over unit (2d) randomly select asynchronous-modulation processing unit (ASM) (2e) or pulse-position-modulation processing unit (PPM). When the PPM is selected, another branching processing is performed by making the changing-over unit (2d) select a first PPM (2f) or a second PPM (2g) depending on the on-duty cycle.

10 Claims, 15 Drawing Sheets

U.S. PATENT DOCUMENTS

| | | |
|---|---|---|
| 5,901,176 A | 5/1999 | Lewison |
| 5,933,453 A | 8/1999 | Lewison |
| RE38,454 E * | 3/2004 | Walters et al. ............... 323/272 |
| 6,911,808 B1 | 6/2005 | Shimamori |
| 8,299,764 B2 * | 10/2012 | Laur et al. .................... 323/224 |
| 2006/0127066 A1 * | 6/2006 | Chiu et al. .................... 388/804 |
| 2008/0129265 A1 * | 6/2008 | Rosenthal ..................... 323/283 |
| 2009/0108828 A1 * | 4/2009 | Edamula ....................... 323/318 |

FOREIGN PATENT DOCUMENTS

| | | |
|---|---|---|
| JP | 11-289753 | 10/1999 |
| JP | 2006-288103 | 10/2006 |
| JP | 2006-288104 | 10/2006 |
| JP | 2008-148204 | 6/2008 |

\* cited by examiner

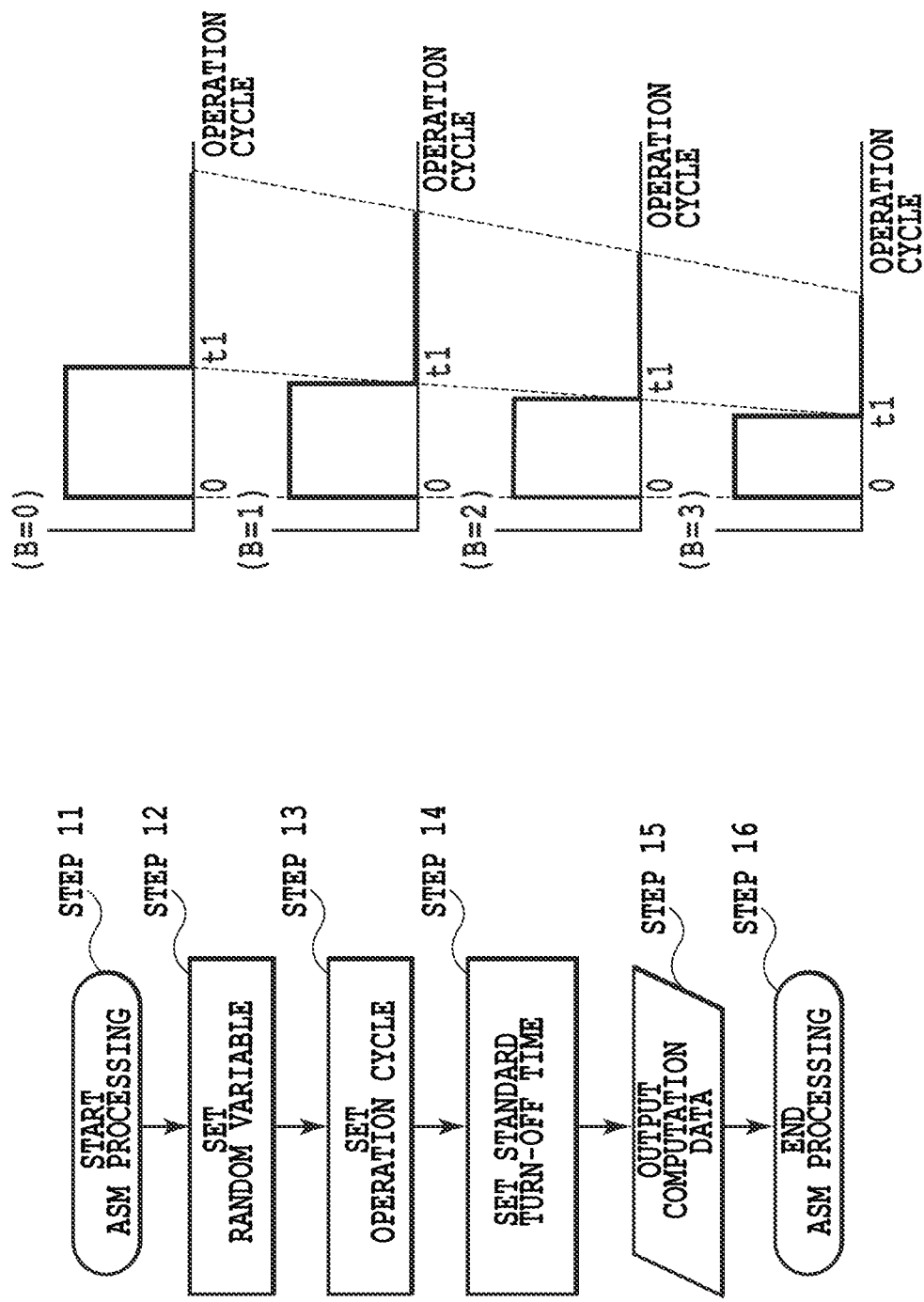

us 8,415,938 B2

SWITCHING REGULATOR

TECHNICAL FIELD

The invention relates to a switching regulator for driving a switching element in a power-supply apparatus, a motor-controlling apparatus, or the like that uses an output voltage or output current produced by switching action. Specifically, the invention relates to a technique to spread a frequency spectrum of switching noise produced by switching action over a wide range and to reduce the noise level at a particular frequency.

BACKGROUND ART

Switching-type power-supply apparatuses and motor-controlling apparatuses have an advantage of losing less electric power than series-regulator type apparatuses. The switching-type apparatuses, however, have a drawback that their switching actions produce switching noises, which may affect adversely other electronic devices and apparatuses. Specifically, there is a case where a power-supply apparatus of switching type is situated near an electronic device, for instance, an audio device such as a radio receiver that emits voices, music, or melodies. In this case, the switching noises produced by the power-supply apparatus are sometimes superposed on the voices, the music, or the melodies, resulting in deterioration in the quality of the sound that the audio device produces.

Conventional techniques have been dealing with this problem attributable to switching noises by, for example, setting the switching frequency at a value not overlapping the radio frequency or at a value outside the audible frequency range as well as providing a built-in component for suppressing noises in the power-supply apparatus or motor-controlling apparatus. The electronic devices of recent years, however, use signals of various frequency ranges, and therefore it is practically difficult to set the switching frequency at a value that does not interfere with any of the signals used by the other electronic devices in use. To address this, techniques have been recently proposed which reduces the noise level of a particular frequency by spreading the frequency spectrum of switching noise in such a way as to variously change the cycle of a driving pulse for driving a switching element, or the time of the rising edge of the driving pulse, as described in Patent Documents 1 and 2.

FIG. 11 illustrates an exemplary configuration of a power-supply apparatus with a built-in switching regulator to keep the noise level of a particular frequency low by spreading the frequency spectrum of the switching noise.

In FIG. 11, a detector is denoted by 1, and a switching regulator 2 is provided on an output side of the detector 1. A driver 3 is situated on an output side of the switching regulator 2. A step-down DC/DC converter 5 is provided between the driver 3 and a load 4. The step-down DC/DC converter 5 includes a switching transistor Q1 and a choke coil L1 which are connected in series between the load 4 and a power-supply line Vcc, a rectifying transistor Q2 and a smoothing capacitor C1. The rectifying transistor Q2 is connected between one end of the choke coil L1 and the ground. The smoothing capacitor C1 is connected between another end of the choke coil L1 and the ground.

In the power-supply apparatus shown in FIG. 11, the detector 1, the switching regulator 2, and the driver 3 are provided to operate the step-down DC/DC converter 5. The detector 1 operates so as to detect the output voltage supplied from the step-down DC/DC converter 5 to the load 4, and to supply the switching regulator 2 with a feedback signal corresponding to the detected output voltage. The switching regulator 2 operates so as to generate a pulse signal with an on-duty cycle, a duty ratio (hereinafter, simply referred to as "on-duty cycle") corresponding to the inputted feedback signal. The driver 3 operates so as to turn on or off the switching transistor Q1 and the rectifying transistor Q2 depending on the pulse signal.

The switching regulator 2 shown in FIG. 11 will be described in more detail. The switching regulator 2 internally includes pulse-width-modulation processing unit (PWM) 2a and pulse-cycle-manipulation processing unit 2b. The pulse-width-modulation processing unit (PWM) 2a mentioned here is a processing unit for setting the on-duty cycle of the pulse signal depending on the signal supplied by the detector 1. On the other hand, the pulse-cycle-manipulation processing unit 2b is a processing unit for manipulating cycles of pulse waveforms in accordance with a predetermined waveform pattern in a way that consecutive pulse waveforms of a predetermined number include two or more pulses having different cycles. The pulse signal thus generated through the pulse-width-modulation processing unit (PWM) 2a and the pulse-cycle-manipulation processing unit 2b has waveforms shown in FIGS. 12A and 12B, for example.

The pulse signal shown in FIG. 12A includes a combination of three pulses T1, T2, and T3 in a series of pulse-signal cycles T4. A high-value period of each of the three pulses T1, T2, and T3 has a length depending on the feedback signal supplied from the detector 1 and on the cycle of the corresponding pulse T1, T2, or T3. In FIG. 12A, the high-value periods of the pulses T1, T2, and T3 are set at such lengths that all the three pulses T1, T2, and T3 have the same on-duty cycle, for instance, 50(%). Each cycle of the pulses T1, T2, and T3 is manipulated in accordance with a predetermined waveform pattern. Specifically, the pulse T1 is set shorter than the pulse T2, and the pulse T3 is set to have the same length as the pulse T2.

The pulse signal shown in FIG. 12B also includes a combination of three pulses T6, T7, and T8 in a series of pulse-signal cycles T5. As in the case of the pulses T1, T2, and T3 shown in FIG. 12A, a high-value period of each of the three pulses T6, T7, and T8 has a length depending on the signal supplied from the detector 1 and on the cycle of the corresponding pulse T6, T7, or T8. In FIG. 12B, the high-value periods of the pulses T6, T7, and T8 are set at such lengths that all the three pulses T6, T7, and T8 have the same on-duty cycle, for instance, 50(%). Each cycle of the pulses T6, T7 and T8 is manipulated, however, in accordance with a waveform pattern different from the one shown in FIG. 12A. Specifically, the cycle of the pulse T6 is set shorter than that of the pulse T7, and the cycle of the pulse T8 is also set shorter than that of the pulse T7. Consequently, the cycles of respective series of pulse signals generated in accordance with respective patterns, that is, the pattern cycles T4 and T5 are set to have lengths different from each other on a waveform pattern basis.

In the pulse signal shown in FIG. 12A, when the level of each of the pulses T1, T2, and T3 is at a high value, the switching element, that is, the switching transistor Q1 shown in FIG. 11 is turned on and turned off when the level is at a low value.

In a case where the switching transistor Q1 is operated by using a pulse signal with the waveform pattern, i.e., the series of pulse signal waveform shown in FIG. 12A, the cycle of the operation of the switching transistor Q1 varies because the waveform pattern includes pulses of different cycles, e.g., the pulses T1 and T2 shown in FIG. 12A. To put it differently, the spectrum of the switching frequency is spread. Along with this, the frequency spectrum of the switching noise is also spread, so that the noise level of a particular frequency is reduced.

The use of only the pulse signal with the waveform pattern shown in FIG. 12A to drive the switching transistor Q1, however, may increase a noise level of the switching noise of a particular frequency for the following reason: for a particular on-duty cycle, the time interval between the turn-off times of two sequent pulses, that is, falling down portions of the pulses is equal to one to an integer of the pattern cycle T4. To solve this problem, the waveform pattern is changed from one to another depending on the on-duty cycle. Specifically, the waveform pattern shown in FIG. 12A is changed to the one shown in FIG. 12B. Since the pattern cycles T4 and T5 have lengths different from each other, the noise level of the switching noise at a particular frequency can be prevented from becoming higher for a particular on-duty cycle.

Besides the changing of the waveform patterns, there is another way to prevent the level of the noise of a particular frequency from becoming high when the interval of the turn-off times of sequent pulse waveforms shown in FIG. 12A is equal to one to an integer of the pattern cycle T4. As FIGS. 13(a) and 13(b) show, different shifting times φ0 to φ2 may be added to the turn-on times of the respective pulse waveforms T9 to T16 in the pattern cycle T17. Note that the waveform pattern shown in FIG. 13(a) is the one before the shifting times φ0 to φ2 are added. The processing unit for adding shifting times of plural kinds to the turn-on times of the pulses will be hereinafter referred to as a pulse-position-modulation processing unit (Pulse Position Modulation).

The waveform pattern shown in FIG. 13(b) includes two different kinds of pulse waveform and three different kinds of shifting time, that is, shifting times φ0, φ1 and φ2. The occurrence frequency of the same combination of a particular pulse waveform and a particular shifting time is kept low, so that the frequency spectrum of the switching noise is spread effectively. To obtain a pulse signal of such waveform pattern, as shown in FIG. 14, the pulse-position-modulation processing unit (PPM) 2c is driven after the pulse-cycle-manipulation processing unit 2b is driven. For example, when the pulse-position-modulation processing unit (PPM) 2c is configured together with the pulse-cycle-manipulation processing unit 2b, as shown in FIG. 14, the constituent parts necessary for the pulse-position-modulation processing unit (PPM) 2c are provided in the switching regulator 2. Instead, when a delay circuit or the like is used in place of the pulse-position-modulation processing unit (PPM) 2c to secure the same function as that of the pulse-position-modulation processing unit (PPM) 2c, the delay circuit or the like may also be situated on the output side of the switching regulator 2, at the previous stage of the driver 3, or in the driver 3.

The pulse-width-modulation processing unit (PWM) 2a, the pulse-cycle-manipulation processing unit 2b, and the pulse-position-modulation processing unit (PPM) 2c are formed of elements such as microcomputers that have computing function. FIG. 15 shows a specific hardware configuration of the switching regulator 2 in this case. The switching regulator 2 shown in FIG. 15 internally includes an A/D converter 2A, a computing unit 2B, and a memory 2C.

The memory 2C in the switching regulator 2 shown in FIG. 15 stores in advance data necessary for the formation of waveform patterns and data for setting the shifting times. The A/D converter 2A converts an analog signal supplied from the detector 1 into a digital signal, and outputs the digital signal. In this state, the computing unit 2B loads the data stored in the memory 2C as appropriate, and generates a pulse signal with a predetermined waveform pattern in accordance with the loaded data. At the same time, the computing unit 2B performs an operation of acquiring the digital signal generated by the A/D converter 2A as appropriate, and making the high-value period of each pulse to be the length corresponding to the digital signal. As a result of the operations of the units 2A to 2C, a pulse signal with a waveform pattern shown in FIG. 13 is inputted from the switching regulator 2 into the driver 3.

The pulse-cycle-manipulation processing unit 2b shown in FIG. 14 manipulates the cycles of the pulse waveforms in accordance with a predetermined pattern so that the sequent pulse waveforms of a predetermined number include pulse waveforms of different cycles. An objective of the pulse-cycle-manipulation processing unit 2b is to vary the operational cycle of the switching element, and thus spread the frequency spectrums of the switching frequency and the switching noise. This objective can be achieved pulse waveforms of different cycles are included in the sequent pulse waveforms of a predetermined number. Thus, the cycles of the pulse waveforms may be manipulated at random, that is, not according to the waveform pattern. Processing unit for manipulating the cycles of pulse waveforms at random is referred to as an asynchronous modulation processing unit. Non-patent document 1 has a research report on the study on the asynchronous modulation processing unit (ASM).

Regarding the series of pulse-signal cycles T17 shown in FIGS. 13(a) and 13(b), the pulse-position-modulation processing unit (PPM) 2c is used instead of changing waveform patterns. In a case where only the pulse-position-modulation processing unit (PPM) 2c is used immediately after the pulse-width-modulation processing unit (PWM) 2a, both the frequency spectrums of the switching frequency and the switching noise are spread as in the case of using the pulse-cycle-manipulation processing unit 2b or the asynchronous-modulation processing unit (ASM). The pulse signal which has the waveform pattern shown in FIG. 13(b) and which is formed by both the pulse-cycle-manipulation processing unit 2b and the pulse-position-modulation processing unit (PPM) 2c can spread effectively the frequency spectrum of the switching noise by taking advantage of the synergy effect of the operations of the pulse-cycle-manipulation processing unit 2b and the pulse-position-modulation processing unit (PPM) 2c. However, if the pulse-position-modulation processing means (PPM) 2c is simply used, a problem occurs that the on-duty cycles are limited by the shifting times as described below.

In a waveform chart shown in FIG. 13(b), for instance, the longest one among the shifting times φ0 to φ2 added to the turn-on times for the pulses T9 to T16 is the shifting time φ2. To spread sufficiently the frequency spectrum of the switching noise and thus to reduce the noise level of a particular frequency, it is preferable to elongate the shifting time φ2 as well as to increase the number of the kinds of shifting times to be set. Incidentally, when the shifting time φ2 is set at half a time length of the pulse T9, the on-duty cycle of the pulse signal at this time must be 50(%) or lower. If the on-duty cycle exceeds 50(%), the high-value period of the preceding pulse T9 and that of the next pulse T10 partially overlap, and thus the on-duty cycles of the pulses T9 and T10 as well as the on-duty cycles of the pattern cycle T17 may deviate from their respective proper values.

Accordingly, if the pulse-position-modulation processing unit (PPM) 2c is used, the maximum value of the on-duty cycle and the maximum value of the shifting times φ0 to φ2 have the trade-off relationship. As the shifting times φ0 to φ2 are set longer, the on-duty cycle has to be set shorter, accordingly.

Under such circumstances, an objective of the present invention is to provide a switching regulator capable of using a pulse-position-modulation processing unit (PPM) 2c without having limitation on the on-duty cycle by shifting times $\phi 0$ to $\phi 2$. Specifically, the switching regulator to be provided by the present invention may generate a pulse signal with an on-duty cycle of 50(%) or higher even when the longest shifting time is set at half a cycle of the pulse waveform.

Patent Document 1: Japanese Patent Laid-Open No. 2006-288103
Patent Document 2: Japanese Patent Laid-Open No. 2006-288104
Non-Patent Document 1: Tetsuro TANAKA and two others, "On the Low-Frequency Output-Noise of a DC-to-DC Converter with Random-Switching Control," The Institute of Electronics, Information and Communication Engineers Transactions B September, 2000, Vol. J38-B, No. 9, pp. 1335-1341.

DISCLOSURE OF THE INVENTION

In order to achieve the above objective, the first aspect of the invention is a switching regulator including a pulse-width-modulation processing unit that determines a duty ratio of a pulse signal for a switching element depending on an output of the switching element, the switching regulator including: a changing-over unit connected to the pulse-width-modulation processing unit and configured to set any one of a first code and a second code; a asynchronous-modulation processing unit configured to operate when the changing-over unit sets the first code; and first and second pulse-position-modulation processing units configured to operate when the changing-over unit sets the second code. The asynchronous-modulation processing unit sets a first operational cycle that is different from a reference cycle, and sets a first turn-off time for the pulse signal on the basis of the first operational cycle and the duty ratio determined by the pulse-width-modulation processing unit. When the duty ratio is 0% to 50%, both inclusive, the first pulse-position-modulation processing unit sets a second operational cycle that is the same as the reference cycle, and a first shifting time for an on-period of the pulse signal to set a second turn-on time and a second turn-off time of the pulse signal on the basis of the operational cycle, the duty ratio, and the first shifting time. When the duty ratio is 50% exclusive to 100% inclusive, the second pulse-position-modulation processing unit sets the second operational cycle that is the same as the reference cycle, and a second shifting time for an off-period of the pulse signal to set a third turn-on time and a third turn-off time of the pulse signal on the basis of the operational cycle, the duty ratio, and the second shifting time.

In addition, the second aspect of the invention is the invention according to the first aspect, further comprising a register unit and a pulse-generation unit. The register unit is configured to hold, as data for each cycle, the duty ratio, the setting by the changing-over unit, the first or second operational cycle, as well as the first turn-off time and the second turn-on and turn-off times or the third turn-on and turn-off times. The pulse-generating unit is configured to load, for each cycle, the data held in the register unit, to generate a pulse waveform based on the data, and to output a pulse signal based on the pulse waveform.

The switching regulator of the present invention is capable of generating a pulse signal including both a pulse signal generated by an asynchronous-modulation processing unit (ASM) and a pulse signal generated by a pulse-position-modulation processing unit (PPM). The switching regulator of the invention includes two systems of pulse-position modulation processing unit that operates in the switching regulator. First pulse-position-modulation processing unit changes the turn-on time so as to shift the on-period, and second pulse-position modulation processing unit changes the turn-off time so as to shift the off-period. The switching regulator of the present invention operates the first pulse-position-modulation processing unit when the on-duty cycle (duty ratio) is 50(%) or lower. The switching regulator of the present invention operates the second pulse-position-modulation processing unit when the on-duty cycle (duty ratio) is higher than 50(%). The switching regulator can thereby obtain an effect that the on-duty cycle (duty ratio) is not limited by shifting times.

BRIEF DESCRIPTION OF THE DRAWINGS

FIG. 7A is a flowchart illustrating an operation by the asynchronous-modulation processing unit (ASM) according to the present invention and illustrating a flow of specific processes included in a routine processing performed by the ASM;

FIG. 7B is a waveform chart illustrating the waveforms of pulses obtained by the operation of the asynchronous-modulation processing unit (ASM) according to the present invention;

BEST MODE FOR CARRYING OUT THE INVENTION

A switching regulator according to an embodiment of the present invention will be described below by referring to the accompanying drawings.

Figure 1:
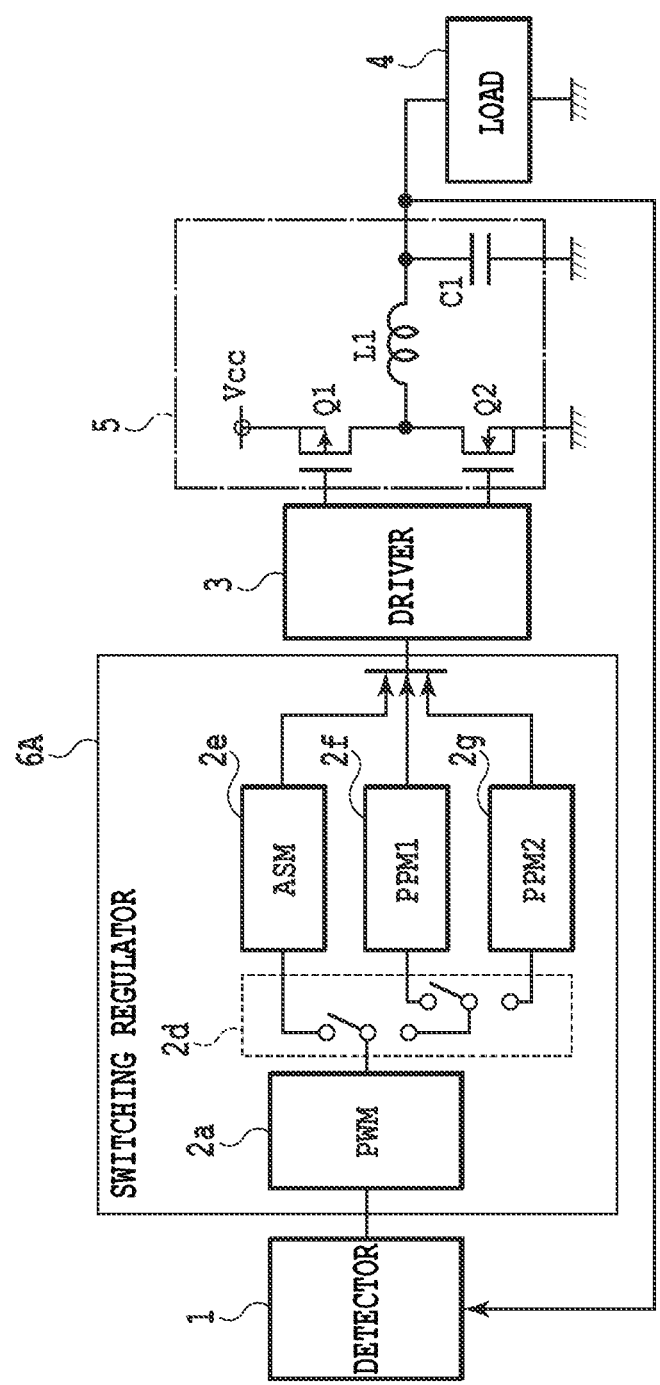
FIG. 1 is a circuit-configuration diagram illustrating a switching regulator according to the invention and a power-supply apparatus having the switching regulator built therein.

FIG. 1 illustrates a configuration of a switching regulator 6A according to the present invention and a power-supply apparatus internally including the switching regulator 6A. The power-supply apparatus of the present invention has the same configuration as the power-supply apparatuses of conventional technique except for the switching regulator 6A. A power-supply apparatus 6 includes a detector 1, the switching regulator 6A, and a driver 3. In addition, as in the case of the conventional technique, the power-supply apparatus 6 includes a step-down DC/DC converter 5 and a load 4, which are provided on an output side of the driver 3.

Figure 3:
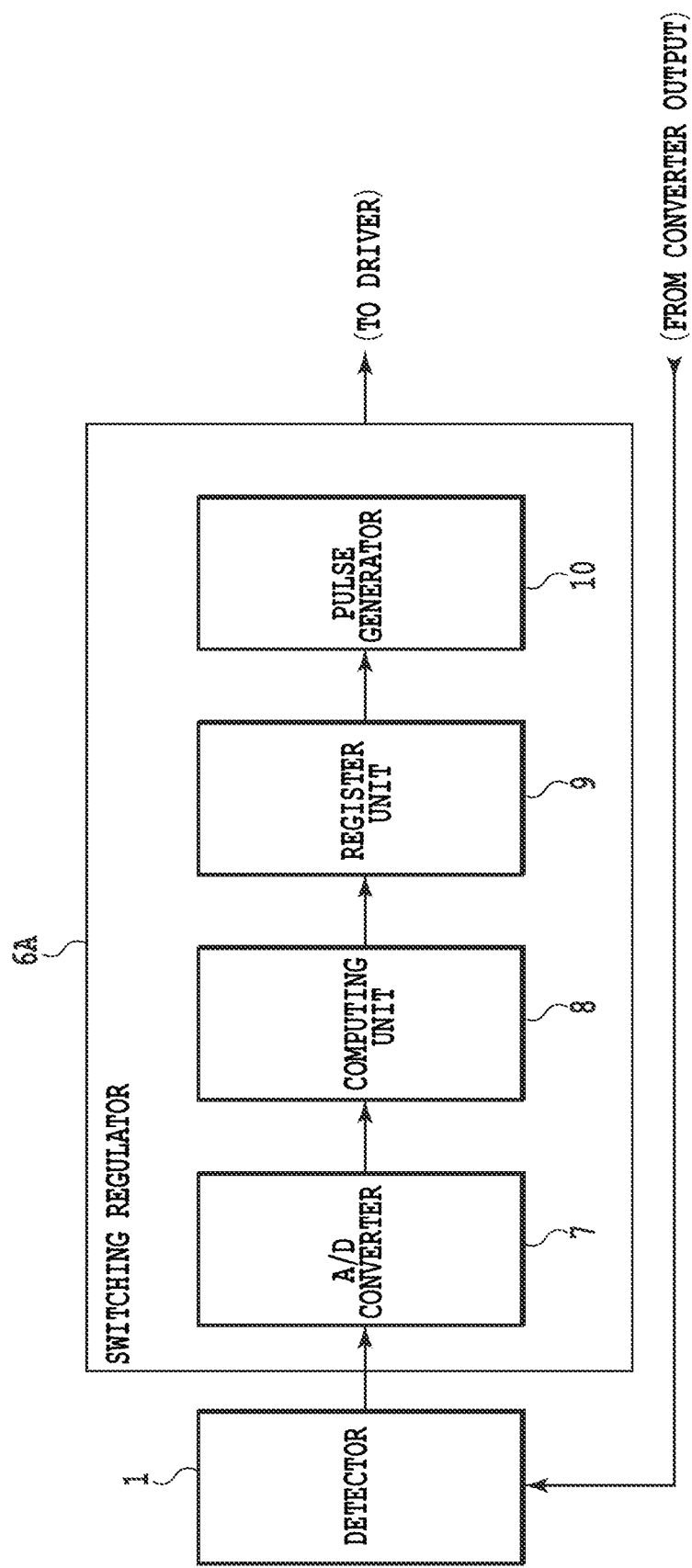
FIG. 3 is a block diagram illustrating an exemplary configuration of the switching regulator according to the invention.

As FIG. 3 shows, the switching regulator 6A shown in FIG. 1 includes therein a computing unit 8 that has a computing function. Through the computation processing of the computing unit 8, the switching regulator 6A implements the functions of the following processing units.

Firstly, the switching regulator 6A makes a pulse-width-modulation processing unit (PWM) 2a shown in FIG. 1 perform a pulse-width-modulation processing where the pulse-width-modulation processing unit (PWM) 2a receives a feedback signal that corresponds to the output of the detector 1, and then determines the on-duty cycle of a pulse signal. Subsequently, the signals and data obtained by the pulse-width-modulation processing unit (PWM) 2a are subjected to further modulation processing to spread frequency spectrum. To this end, branching processing is performed where switch changing-over unit 2d randomly selects either the asynchronous-modulation processing unit (ASM) 2e or the pulse-position-modulation processing unit (PPM). When the pulse-position-modulation processing unit (PPM) is selected, another branching processing is performed where the switch changing-over unit 2d selects either the first pulse-position-modulation processing unit (PPM1) 2f or second pulse-position-modulation processing unit (PPM2) 2g depending on the on-duty cycle.

When the asynchronous-modulation processing unit (ASM) 2e is selected in the branching processing performed by the switch changing-over unit 2d, the asynchronous-modulation processing unit (ASM) 2e functions so as to set an operational cycle at a duration that is different from a reference cycle and set the turn-off times depending on the operational cycle and the on-duty cycle. Alternatively, when the first pulse-position-modulation processing unit (PPM1) 2f is selected in the branching processing performed by the switch changing-over unit 2d, the first pulse-position-modulation processing unit (PPM1) 2f functions so as to set the operational cycle at the same duration as the reference cycle, and set shifting times for the on-periods. On the basis of the operational cycle and shifting times set as above and the on-duty cycle, the first pulse-position-modulation processing unit (PPM1) 2f sets the turn-on times and the turn-off times.

When the second pulse-position-modulation processing unit (PPM2) 2g is selected in the branching processing performed by the switch changing-over unit 2d, the second pulse-position-modulation processing unit (PPM2) 2g functions so as to set the operational cycle at the same duration as that of the reference cycle, and set shifting times for the off-periods. On the basis of the operational cycle and shifting times set as above and the on-duty cycle, the second pulse-position-modulation processing unit (PPM2) 2g sets the turn-on times and the turn-off times. Pulse waveforms are formed in this manner through the asynchronous-modulation processing unit (ASM) 2e and the first pulse-position-modulation processing unit (PPM1) 2f or the second pulse-position-modulation processing unit (PPM2) 2g. The pulse waveforms thus formed are supplied as a pulse signal to the driver 3.

Figure 2A:
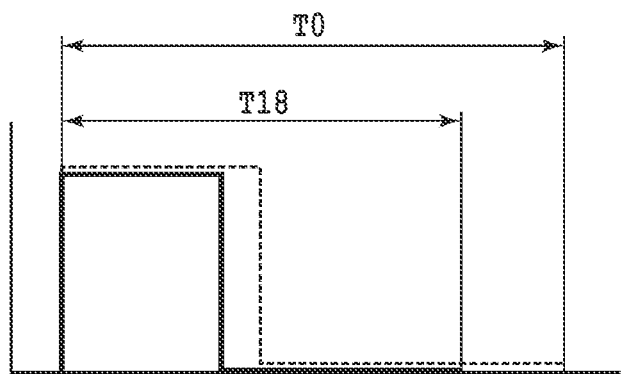
FIG. 2A is a pulse-waveform chart obtained by operating an asynchronous-modulation processing unit (ASM) included in the configuration shown in FIG. 1.
Figure 2B:
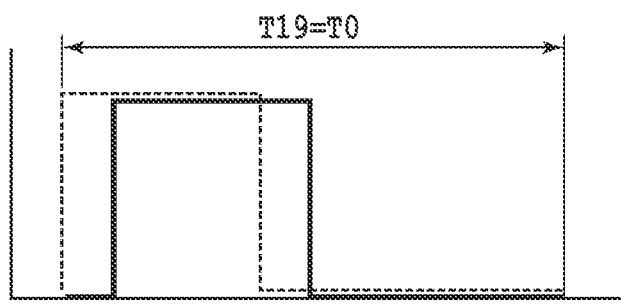
FIG. 2B is a pulse-waveform chart obtained by operating a first pulse-position-modulation processing unit (PPM1) included in the configuration shown in FIG. 1.
Figure 2C:
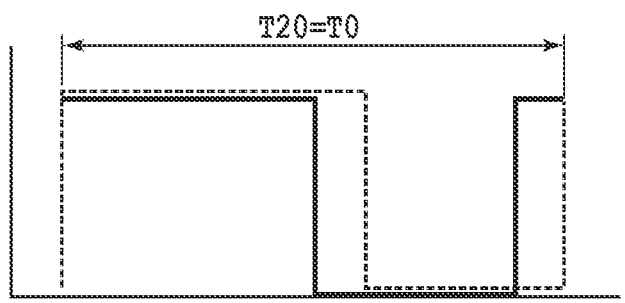
FIG. 2C is a pulse-waveform chart obtained by operating a second pulse-position-modulation processing means (PPM2) included in the configuration shown in FIG. 1.

Specifically, the asynchronous-modulation processing unit (ASM) 2e that operates in the switching regulator 6A forms such a pulse waveform as one shown in FIG. 2A. Note that the pulse waveforms depicted with the dashed lines in FIGS. 2A to 2C are shapes of pulses shaped by the pulse-width-modulation processing unit (PWM) 2a and directly inputted into the driver without operating any of the asynchronous-modulation processing unit (ASM) 2e, the first pulse-position-modulation processing unit (PPM1) 2f, and the second pulse-position-modulation processing unit (PPM2) 2g. In other words, the pulse waveforms depicted with the dashed lines in FIGS. 2A to 2C are shapes of the reference pulses. A cycle T0 represents the reference cycle, which is equivalent to the reference cycle described above. The pulse waveform depicted with the solid line in FIG. 2A represents the pulse waveform that is to be inputted into the driver 3 after the asynchronous-modulation processing unit (ASM) 2e functioned.

The pulse waveform formed after the operation of the asynchronous-modulation processing unit (ASM) 2e and depicted with the solid line has an operational cycle T18 with a duration that is different from that of the reference cycle T0. The operational cycle T18 finishes earlier than the reference cycle by time difference between the reference cycle T0 and the operational cycle T18. The operational cycle T18 and the reference cycle T0 start at the same turn-on time at which the pulse waveform rises from the low value up to the high value. The turn-off time at which the pulse waveform falls from the high value down to the low value, on the other hand, comes earlier than that of the reference cycle T0 depending on the proportion of the operational cycle T18 to the reference cycle T0. In the pulse waveform depicted with the solid line, the frequency spectrum of the pulse itself is spread by changing the operational cycle T18. In addition, by shortening the turn-off time according to the proportion of the operational cycle T18 to the reference cycle T0, the on-duty cycle set before the asynchronous-modulation processing unit (ASM) 2e starts its operation can be kept even after the asynchronous-modulation processing unit (ASM) 2e finishes its operation.

In order to operate the asynchronous-modulation processing unit (ASM) 2e to generate the pulse waveform depicted with the solid line in FIG. 2A, firstly, the operational cycle T18 is set at a duration that is different from that of the reference cycle T0. On the basis of this operational cycle T18 and the on-duty cycle, the turn-off time is set appropriately. The pulse waveform is shaped on the basis of these two set values so as to have the high value at the start of the cycle, to have the low value when the turn-off time comes after the start of the cycle, and to terminate the cycle when the operational cycle T18 passes. The pulse waveform depicted with the solid line in FIG. 2A is obtained in this way.

The first pulse-position-modulation processing unit (PPM1) 2f that operates in the switching regulator 6A, on the other hand, shapes such a pulse waveform as one shown in FIG. 2B. The dashed line in FIG. 2B is the pulse waveform of the reference pulse T0. The solid line in FIG. 2B represents the pulse waveform that is to be inputted into the driver 3 after the first pulse-position-modulation processing unit (PPM1) 2f functioned.

The pulse waveform after the first pulse-position-modulation processing unit (PPM1) 2f functioned which is depicted with the solid line has an operational cycle T19 with the same duration as that of the reference cycle T0 and has the on-period with the same duration as that of the reference pulse. The pulse waveform depicted with the solid line and the reference pulse, however, are different in that the turn-on time, at which the pulse waveform rises from the low value up to the high value, and the turn-off time, at which the pulse waveform falls from the high value down to the low value, are shifted. The pulse waveform depicted with the solid line has the same operational cycle T19 and the on-period as the reference pulse, so that the on-duty cycle set before the first pulse-position-modulation processing unit (PPM1) 2f starts its operation is kept after the first pulse-position-modulation processing unit (PPM1) 2f finishes its operation.

In addition, in the pulse waveform depicted in solid line, the intervals between the turn-on times of the adjacent pulse waveforms change according to the shifting amount of the turn-on time, that is, the shifting time. Assume a case where three waveforms including the pulse waveform depicted with the solid line, the previous one, and the next one together form a single waveform pattern whose entire cycle is three times the reference cycle T0. The assumed case is equivalent to a case where all the pulse waveforms changed their respective cycles. For example, suppose a case where the turn-on time of the middle one of three sequent pulse waveforms shifts as FIG. 2B shows while the turn-on times of the previous and the next ones do not shift. In this case, the cycle of the next pulse waveform is the same as the reference cycle T0. The cycle of the previous pulse waveform, however, is longer than the reference cycle T0, and the cycle of the middle pulse waveform is shorter than the reference cycle T0. This consequently leads to spreading of the frequency spectrum of pulse waveforms.

In order to operate the first pulse-position-modulation processing unit (PPM1) 2f to generate the pulse waveform depicted with the solid line in FIG. 2B, firstly, the operational cycle T19 is set at a duration that is the same as that of the reference cycle T0 and the shifting time for the on-period is set either randomly or in accordance with a predetermined pattern. On the basis of the shifting time thus set, the turn-on time and the turn-off time are set appropriately. The pulse waveform is shaped on the basis of these set values so as to have the low value at the start of the cycle, to have the high value at the turn-on time, to have the low value at the turn-off time, and to terminate the cycle as the operational cycle T19 passes. The pulse waveform depicted with the solid line in FIG. 2B is obtained in this way.

Finally, the second pulse-position-modulation processing unit (PPM2) 2g that operates in the switching regulator 6A shapes such a pulse waveform as one shown in FIG. 2C. The dashed line in FIG. 2C represents the waveform of the reference pulse. The solid line in FIG. 2C represents the pulse waveform that is to be inputted into the driver 3 after the second pulse-position-modulation processing unit (PPM2) 2g finishes its operation. Note that since the second pulse-position-modulation processing unit (PPM2) 2g is selected when the value of the on-duty cycle is high, the durations of the on-period and of the off-period of the pulse waveform shown in FIG. 2C have an opposite relationship from those of the pulse waveform shown in FIG. 2B.

The pulse waveform formed after the second pulse-position-modulation processing unit (PPM2) 2g finishes its operation which is depicted with the solid line has the same operational cycle T20 with the reference cycle T0 and has the same on-period or the off-period with the reference pulse. The pulse waveform depicted with the solid line and the reference pulse, however, are different in the following point: the turn-off time, at which the pulse waveform falls from the high value down to the low value, is shifted and after an off-period with the same duration as that of the reference pulse passes, the pulse waveform rises anew from the low value up to the high value, that is, the pulse waveform is turned. The pulse waveform depicted with the solid line has the same operational cycle T20 and the off-period as the reference pulse. For this reason, the on-duty cycle set before the second pulse-position-modulation processing unit (PPM2) 2g starts its operation is kept after the second pulse-position-modulation processing unit (PPM2) 2g finishes its operation.

Also, in the pulse waveform depicted by the solid line, the intervals between the turn-off times of the sequent pulse waveforms change depending on the shifting time of the turn-off time. As in the case of the first pulse-position-modulation processing unit (PPM1) 2f, this is equivalent to a case where all the pulse waveforms change their respective cycles. This consequently leads to spreading of the frequency spectrum of pulses.

In order to operate the second pulse-position-modulation processing unit (PPM2) 2g to generate the pulse waveform depicted with the solid line in FIG. 2C, firstly, the operational cycle T20 is set at a duration that is the same as that of the reference cycle T0, and the shifting time for the off-period is set. On the basis of the shifting time, the turn-off time and the turn-on time are set. The pulse waveform is obtained on the basis of these set values so as to have the high value at the start of the cycle, to have the low value at the turn-off time, to have the high value again at the turn-on time, and to terminate the cycle when the operational cycle T20 passes. The pulse waveform depicted with the solid line in FIG. 2B is obtained in this way.

In the pulse waveform shown in FIG. 2B which is obtained by operating the first pulse-position-modulation processing unit (PPM1) 2f, the on-duty cycle of the pulse waveform can be changed within a range of 0 to 50(%) when the maximum value of the shifting time for the turn-on time is set, for instance, at half the length of T19 (i.e., the reference cycle T0). On the other hand, in the pulse waveform shown in FIG. 2C which is obtained by operating the second pulse-position-modulation processing unit (PPM2) 2g, the on-duty cycle of the pulse waveform can be changed within a range of 50 to 100(%) when the maximum value of the shifting time for the turn-off time is set, for instance, at half the length of T20 (i.e., the reference cycle T0). The switching regulator 6A of the invention uses the functions of these two pulse-position-modulation processing units, i.e., the first pulse-position-modulation processing unit (PPM1) 2f and the second pulse-position-modulation processing unit (PPM2) 2g, and switches from one to the other depending on the on-duty cycle. Thus, the invention is capable of achieving a regulator of which the on-duty cycle is not limited by the shifting time.

Specifically, the switching regulator 6A according to the present invention has a configuration shown in FIG. 3. FIG. 3 shows that the switching regulator 6A internally includes an A/D converter 7, a computing unit 8, a register unit 9, and a pulse generator 10. The switching regulator 6A operates in the following way.

Firstly, the A/D converter 7 converts from analog to digital the feedback signal inputted from the detector 1 into the switching regulator 6A. As FIG. 1 shows, the computing unit 8 includes, in the form of a software or a hardware, the pulse-width-modulation processing unit (PWM) 2a, the switch changing-over unit 2d, the asynchronous-modulation processing unit (ASM) 2e, the first pulse-position-modulation processing unit (PPM1) 2f, and the second pulse-position-modulation processing unit (PPM2) 2g. The computing unit 8 receives the feedback signal digitized by the A/D converter 7, and is in charge of the computations and data processing operations in the pulse-width-modulation processing unit (PWM) 2a, the asynchronous-modulation processing unit (ASM) 2e, the first pulse-position-modulation processing unit (PPM1) 2f, and the second pulse-position-modulation processing unit (PPM2) 2g. The register unit 9 receives the data obtained by the computations and data processing operations by the computing unit 8, and holds the received data.

Immediately before the start of a cycle of a pulse waveform, that is, immediately before the start of the generation operation of one pulse waveform, the pulse generator 10 loads the data held by the register unit 9. Then, the pulse generator 10 sets the pulse waveform at the high value or at the low value depending on the loaded data, and then generates a desired pulse waveform, which is a pulse generated by operating the pulse-width-modulation processing unit (PWM) 2a and then by operating any one of the asynchronous-modulation processing unit (ASM) 2e, the first pulse-position-modulation processing unit (PPM1) 2f, and the second pulse-position-modulation processing unit (PPM2) 2g. The pulse generator 10 performs pulse generation operations successively, and a pulse signal including a sequence of plural kinds of pulse waveforms is inputted from the switching regulator 6A to the driver 3.

Since apparatuses such as power-supply apparatuses have been downsized in recent years, the frequencies at which switching elements operates, that is, the switching frequencies have become higher. Along with this trend, the cycles of pulse waveforms have become shorter. When the computing time becomes nonnegligible relative to the cycle of the pulse waveform due to the shortening of the cycle, the operation of the computing unit 8 and that of the pulse generator 10 are performed in a parallel manner.

Figure 4:
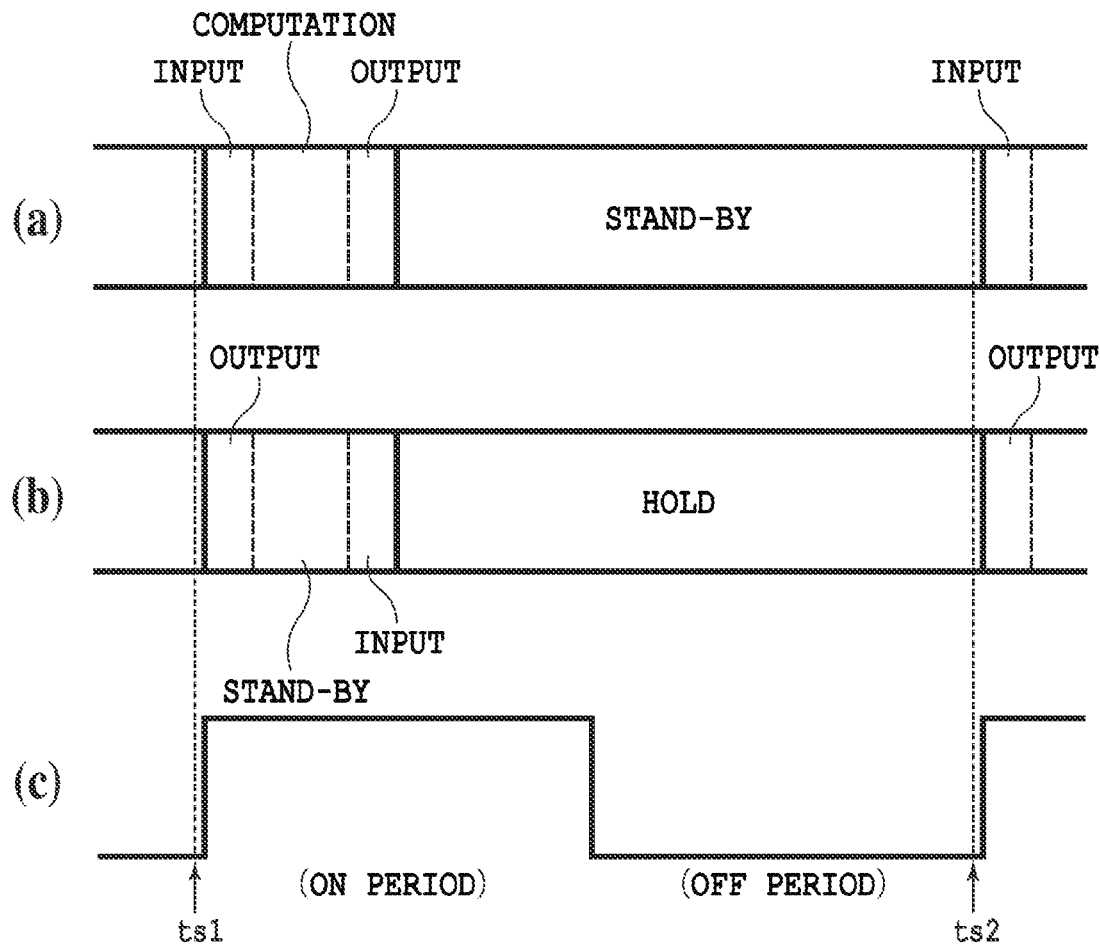
FIG. 4 is a timing chart for the operation of each of the components shown in FIG. 3.

FIGS. 4(a), 4(b), and 4(c) respectively illustrate the operations of the computing unit 8, the register unit 9, and the pulse generator 10.

For example, in FIG. 4(c), let's assume the pulse generator 10 starts the pulse generation operation at a predetermined time ts1. After starting the operation, the pulse generator 10 loads data from the register unit 9 to generate pulse waveforms in accordance with the loaded data. When the computing time becomes nonnegligible relative to the cycle of the pulse waveform, the computing unit 8 is configured to start its operation at a time that is later than the time ts1.

Although specific computations and data processing operations to be performed by the computing unit 8 will be described later, in short, the computing unit 8 receives the digitized feedback signal from the A/D converter 7, and is in charge of the computations and data processing operations at the pulse-width-modulation processing unit (PWM) 2a, the asynchronous-modulation processing unit (ASM) 2e, the first pulse-position-modulation processing unit (PPM1) 2f, and the second pulse-position-modulation processing unit (PPM2) 2g. The register unit 9 receives the data obtained by the computations and the data processing operations performed by the computing unit 8, and holds the received data.

The data thus obtained here is inputted to the register unit 9 after being subjected to the computations and the data processing operations. Then, as FIG. 4(a) shows, the computing unit 8 enters a stand-by state until a time ts2 at which the computing unit 8 starts the next pulse generation operation. By thus operating the computing unit 8 and the pulse generator 10 simultaneously in a parallel fashion, even a long computing time does not affect the generation of the pulse signal.

There is a small time gap between the time when the pulse generator 10 starts the pulse generation operation by loading data and the time when the pulse generator 10 outputs the pulse waveforms thus generated. The gap, however, is negligible relative to the time needed for the computation by the computing unit 8. In this regard, the duration of the time gap can be easily made constant almost every time, unlike the computation processing time for alternatively operating any one of the asynchronous-modulation processing unit (ASM) 2e, the first pulse-position-modulation processing unit (PPM1) 2f, and the second pulse-position-modulation processing unit (PPM2) 2g depending on the selection result of the switch changing-over unit 2d. Correction the cycle of the pulse waveform in advance by a length corresponding to the time gap can make the time gap ignorable.

Figure 5:
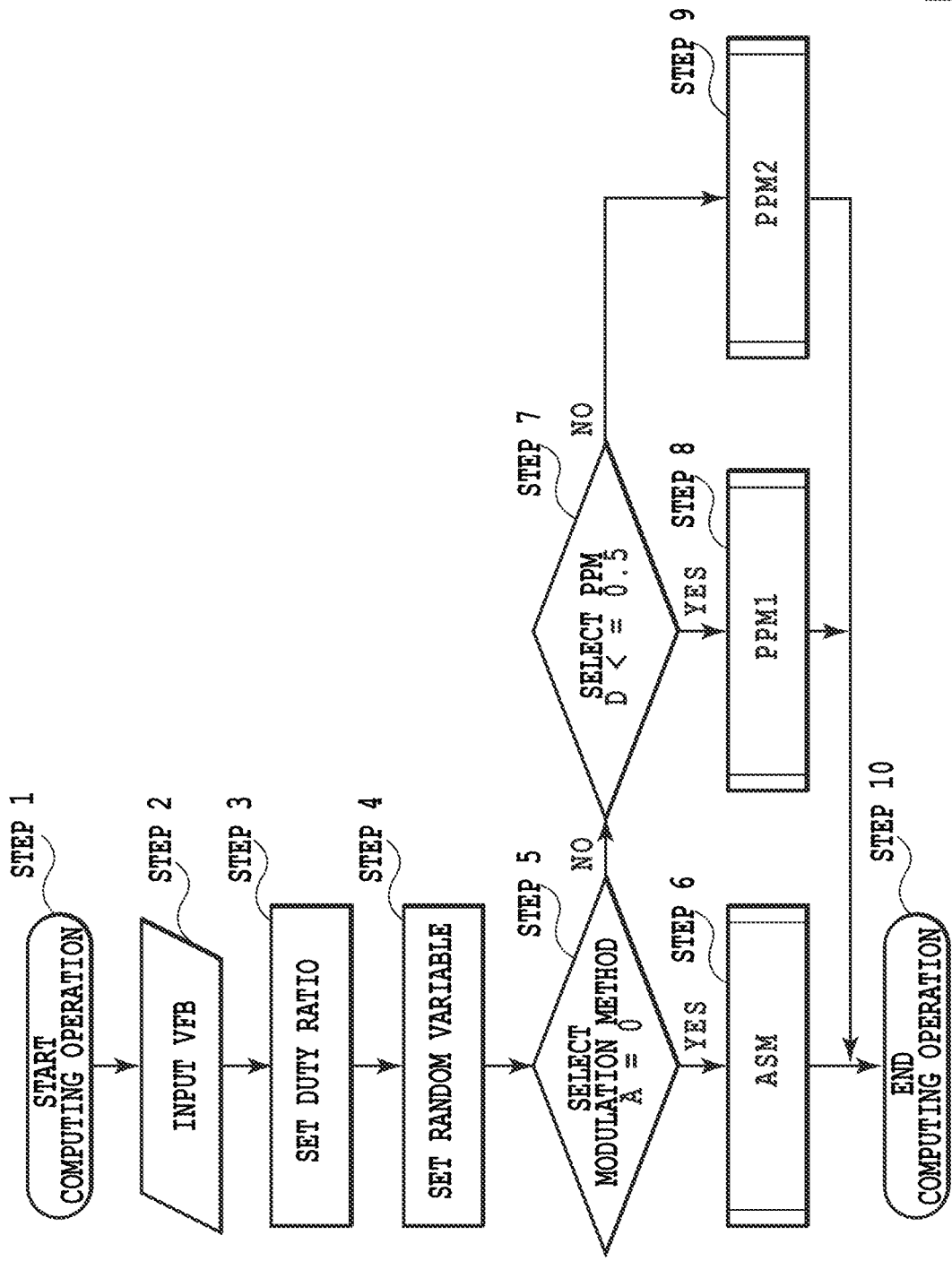
FIG. 5 is a flowchart illustrating a flow of computations and data processing operations performed by a computing unit shown in FIG. 3.

FIG. 5 shows an operational routine that illustrates the operations of the computing unit 8 which is a flow of specific computations and data processing operations (hereafter, simply referred to as "processing operations").

Figure 6:
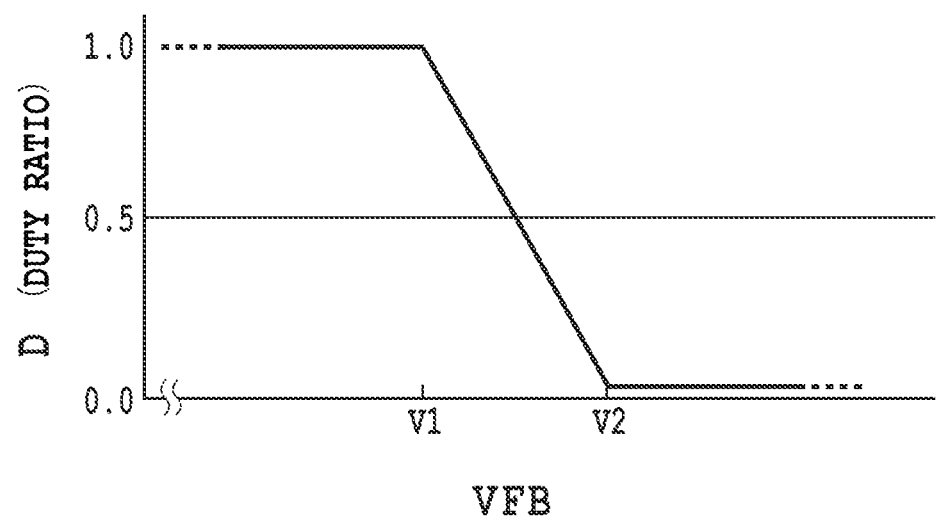
FIG. 6 is a characteristic chart illustrating the relationship between the feedback signal VFB and the duty ratio D in the operation of the computing unit shown in FIG. 5.

A computation operation starts at step 1. Then at step 2, a VFB-input processing operation is performed where the digitized feedback signal VFB is taken in from the A/D converter 7. Then at step 3, a processing operation to set a duty ratio is subsequently performed where the duty ratio D is determined depending on the magnitude of the value of the feedback signal. In the processing operation to set the duty ratio, for example, the relationship shown in FIG. 6 between the feedback signal VFB and the duty ratio D is used to determine the duty ratio depending on the feedback signal.

Following the processing operation to set the duty ratio, a processing operation to set a random variable is performed at step 4, and then a processing operation to select a modulation method is performed at step 5. A random variable A set in this processing operation 1 takes any one of the two codes "0" and "1." The code of the random variable A is used to branch the flow of processing operations in the processing operation to select a modulation method. For instance, when the random variable A is "0," the processing operations proceed in the direction of the ASM processing routine performed by the asynchronous-modulation processing unit (ASM) 2e at step 6. When the random variable A is "1," the processing operations proceed in the direction of the PPM-selection processing operation performed either by the first pulse-position-modulation processing unit (PPM1) 2f or the second pulse-position-modulation processing unit (PPM2) 2g.

When the processing operations proceed in the direction of the PPM-selection processing operation at step 7, the PPM-selection processing operation further branches the flow of processing operation depending on the duty ratio D. Specifically, when the duty ratio D is 50(%) or lower, the processing operations proceed in the direction of a PPM1 processing routine performed by the first pulse-position-modulation processing unit (PPM1) $2f$ at step 8. When the duty ratio D is higher than 50(%), the processing operations proceed in the direction of a PPM2 processing routine performed by the second pulse-position-modulation processing unit (PPM2) $2g$ at step 9. With the two processing operations for selection at steps 5 and 7, the ASM processing routine at step 6, the PPM1 processing routine at step 8, or the PPM2 processing routine at step 9 alternatively operates. After that, the single computation operation is finished at step 10.

The ASM processing routine at step 6 in the flow of processing operations shown in FIG. 5 has a flow of processing operations shown in FIG. 7A. Once the ASM processing routine starts, an asynchronous-modulation processing operation starts at step 11 shown in FIG. 7A. Then, a processing operation to set a random variable is performed at step 12 and, subsequently, a processing operation to set an operational cycle is performed at step 13. In the processing operation to set a random variable, a random variable B is set at a randomly and alternatively selected one of a plurality of values. The processing operation to set an operational cycle changes the operational cycle depending on the value of the random variable B. For instance, the random variable B is set at a value among "0," "1," "2," or "3." Meanwhile, the operational cycle is set at a period that is shorter than the reference cycle T0 by a length obtained by multiplying the reference cycle T0 by ⅛ and the random variable B, that is, shorter than the reference cycle T0 by a length equal to T0×⅛×B.

Once the processing operation to set operational cycle at step 13 is finished, a processing operation to set a standard turn-off time is performed at step 14. Here, a standard turn-off time t1 is obtained and set on the basis of both the operational cycle set in the processing operation to set an operational cycle and the duty ratio D set in the processing operation to set a duty ratio. After the completion of the processing operation to set a standard turn-off time, a processing operation to output a computed data is performed at step 15. In the processing operation to output a computed data, all the set values that have been set in the course of processing operations shown in FIGS. 5 and 7A since the start of the computation operation are sent as data to the register unit 9 shown in FIG. 3. For example, the data sent to the register unit 9 includes the duty ratio D, the random variable A, the operational cycle, and the standard turn-off time t1. After the processing operation to output the computed data at step 15, the ASM processing routine is terminated at step 16.

Suppose a case where, in the flow from the start of the computation operation at step 11 to the end of the computation operation at step 16, the processing operations from step 1 to step 5 shown in FIG. 5 and the processing operations from step 11 to step 16 shown in FIG. 7A are successively performed. FIG. 7B shows pulse waveforms generated on the basis of the data set in the course of the processing operations in this case. The pulse waveforms shown in FIG. 7B correspond to cases where the random variable B is set at values "0," "1," "2," and "3," respectively. In accordance with the value of the random variable B, both the duration of the operational cycle and the standard turn-off time t1 are changed.

Figure 8A:
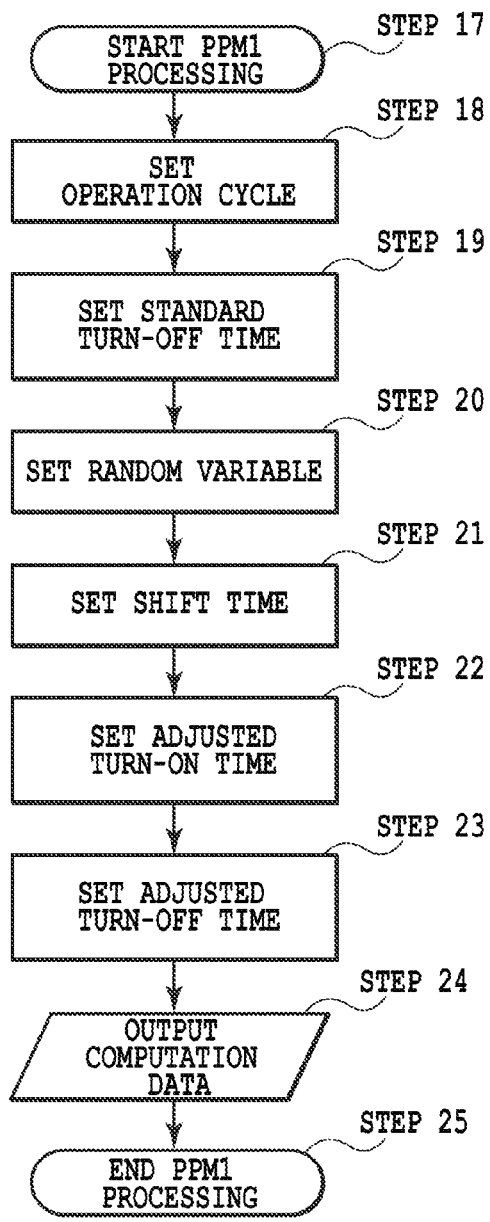
FIG. 8A is a flowchart illustrating an operation by the first pulse-position-modulation processing unit (PPM1) and illustrating a flow of specific processes included in the routine processing performed by the PPM1.

The PPM1 processing routine at step 8 in the flow of processing operations shown in FIG. 5 has a flow of processing operations shown in FIG. 8A. Once the PPM1 processing routine starts at step 17, a processing operation to set an operational cycle is performed as step 18, and, subsequently, a processing operation to set a standard turn-off time is performed at step 19. In the processing operation to set the operational cycle, the operational cycle is set at the reference cycle T0. In the processing operation to set the standard turn-off time, the standard turn-off time t1 is obtained on the basis of the operational cycle and the duty ratio D that have been obtained previously, and is thus set.

After the completion of the processing operation to set a standard turn-off time at step 19, a processing operation to set a random variable is performed at step 20, and, subsequently, a processing operation to set a shifting time is performed at step 21. In the processing operation to set a random variable, the random variable B is set at a randomly and alternatively selected one of a plurality of values. In the processing operation to set a shifting time, at step 21, a shifting time ts for the on-period of the pulse waveform is set depending on the value of the random variable B. For instance, the random variable B is set at a value among "0," "1," "2," or "3." Meanwhile, the shifting time ts is set at a period obtained by multiplying the reference cycle T0 by ⅛ and the random variable B, that is, a period equal to T0×⅛×B.

After the completion of the processing operation to set a shifting time at step 21, a processing operation to set an adjusted turn-on time is performed at step 22, and, subsequently, a processing operation to set an adjusted turn-off time is performed at step 23. In the processing operations to set the adjusted turn-on and turn-off times, the adjusted turn-on time t2 is set to the shifting time ts and the adjusted turn-off time t3 is set to a value that is increased by the shifting time ts from the standard turn-off time t1, so that the on-period of the pulse waveform is shifted by an amount corresponding to the shifting time ts. As exemplified in the pulse waveforms in FIG. 8B, the adjusted turn-on time t2 is set at a value increased from 0 by the predetermined shifting time ts, gradually from the uppermost to the lowermost pulse waveforms.

After the processing operation to set an adjusted turn-off time, a processing operation to output a computed data is performed at step 24. In the processing operation to output a computed data, all the set values that have been set in the course of processing operations shown in FIGS. 5 to 8A since the start of the computation operation are sent as data to the register unit 9. Specifically, the data sent to the register unit 9 includes the duty ratio D, the random variable A, the operational cycle, the adjusted turn-on time t2, and the adjusted turn-off time t3. After the completion of the processing operation to output a computed data, the PPM1 processing routine is terminated at step 25.

Figure 8B:
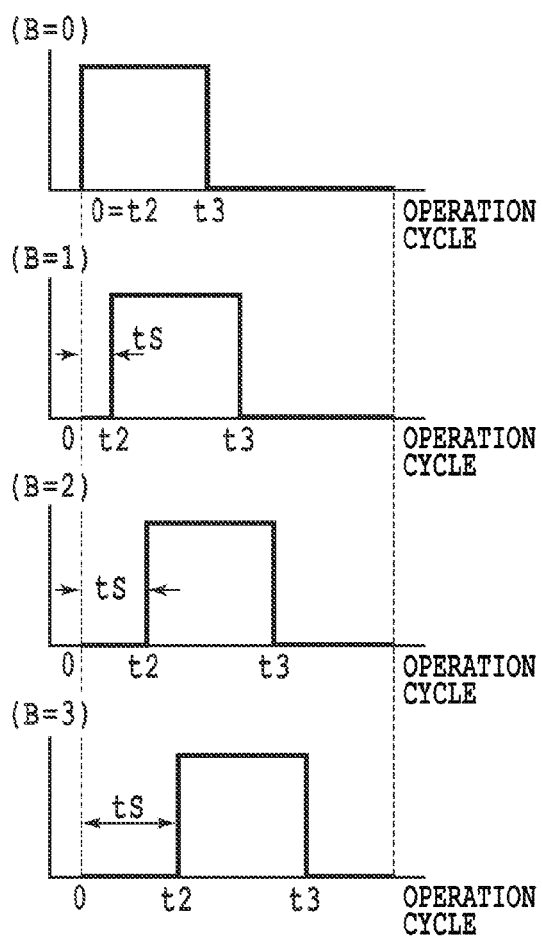
FIG. 8B is a waveform chart of the pulses obtained by the operation of the first pulse-position-modulation processing unit (PPM1)

Suppose a case where, in the flow from the start of the computation operation to the end of the computation operation, the processing operations from step 1 to step 5 and step 7 shown in FIG. 5 and the processing operations from step 17 to step 25 shown in FIG. 8A are successively performed. FIG. 8B shows pulse waveforms generated on the basis of the data set in the course of the processing operations in this case. The pulse waveforms shown from top to the bottom in FIG. 8B correspond to cases where the random variable B is set at values "0," "1," "2," and "3," respectively.

Figure 9A:
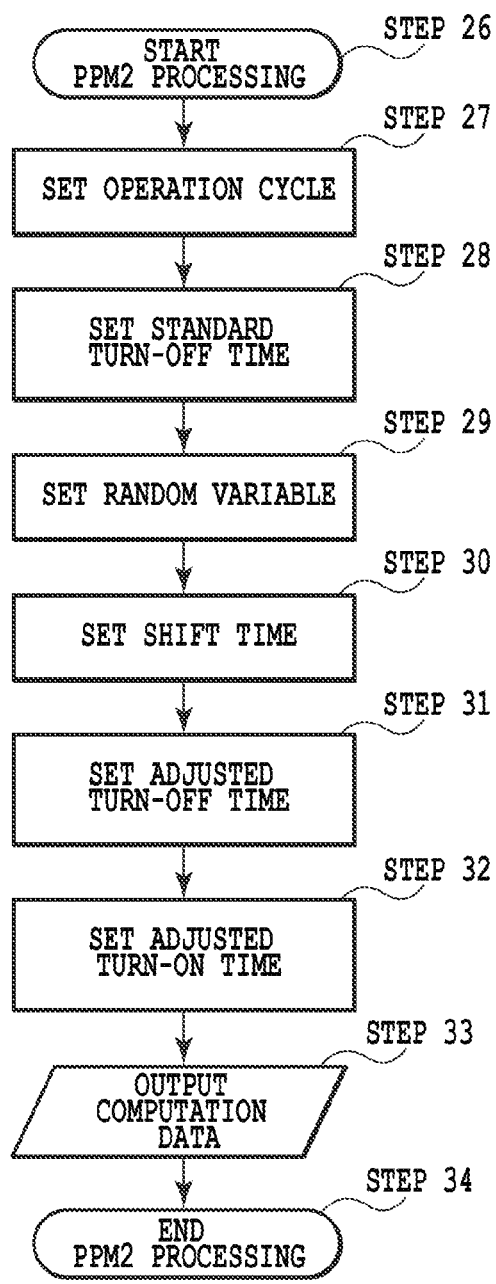
FIG. 9A is a flowchart illustrating an operation by the second pulse-position-modulation processing unit (PPM2) and illustrating a flow of specific processes included in the routine processing performed by the PPM2.

The PPM2 processing routine in the processing operation shown at step 9 in FIG. 5 has a flow of processing operations shown in FIG. 9A.

Once the PPM2 processing routine starts at step 26, a processing operation to set an operational cycle is performed as step 27, and, subsequently, a processing operation to set a standard turn-off time is performed at step 28. In the processing operation to set an operational cycle, the operational cycle is set at the reference cycle T0. In the processing operation to set a standard turn-off time, the standard turn-off time t1 is obtained on the basis of the operational cycle and the duty ratio D that have been obtained previously, and is thus set.

After the completion of the processing operation to set a standard turn-off time at step 28, a processing operation to set a random variable is performed at step 29, and, subsequently, a processing operation to set a shifting time is performed at step 30. In the processing operation to set a random variable, the random variable B is set at a randomly and alternatively selected one of a plurality of values. In the processing operation to set a shifting time, a shifting time ts, that is, the shifting amount, for the off-period of the pulse is set depending on the value of the random variable B. For instance, the random variable B is set at a value "0," "1," "2," or "3." Meanwhile, the shifting time ts is set at a period obtained by multiplying the reference cycle T0 by ⅛ and the random variable B.

Figure 9B:
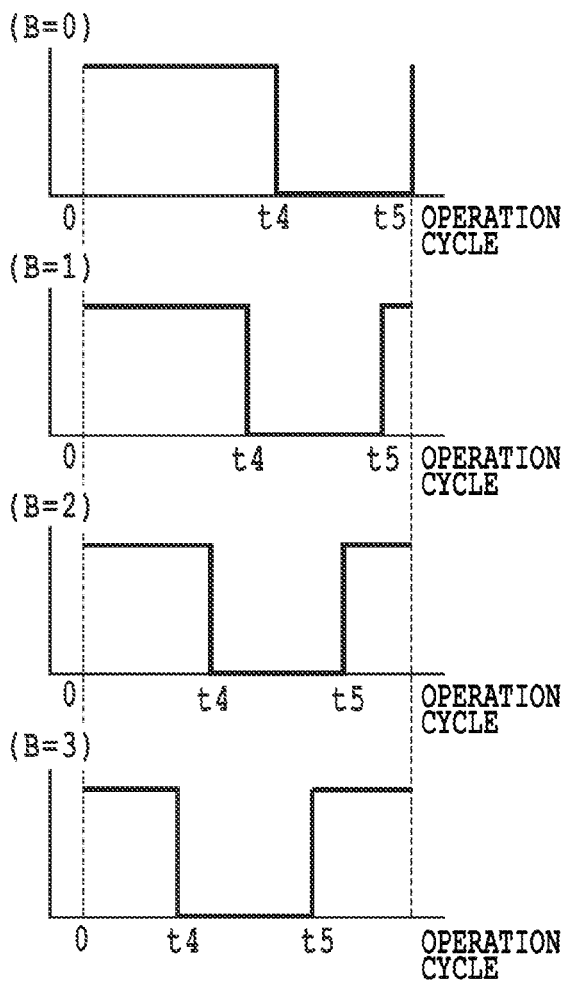
FIG. 9B is a waveform chart of the pulses obtained by operation of the second pulse-position-modulation processing unit (PPM2)

After the completion of the processing operation to set a shifting time at step 30, a processing operation to set an adjusted turn-off time is performed at step 31, and, subsequently, a processing operation to set an adjusted turn-on time is performed at step 32. In the processing operations to set the adjusted turn-off and turn-on times, the adjusted turn-off time t4 is set at a value obtained by subtracting the shifting time ts from the standard turn-on time t1 and the adjusted turn-on time t5 is set at a value obtained by subtracting the shifting time ts from the operational cycle, so that the off-period of the pulse waveform is shifted by an amount corresponding to the shifting time ts. The uppermost operational cycle shown in FIG. 9B is equal to the adjusted turn-on time t5.

After the processing operation to set an adjusted turn-on time at step 32, a processing operation to output a computed data is performed at step 33. In the processing operation to output a computed data, all the set values that have been set in the course of processing operations shown in FIGS. 5 to 9A since the start of the computation operation are sent as data to the register unit 9. Specifically, the data sent to the register unit 9 includes the duty ratio D, the random variable A, the operational cycle, the adjusted turn-off time t4, and the adjusted turn-on time t5. After the completion of the processing operation to output a computed data at step 24, the PPM2 processing routine is terminated at step 34.

Suppose a case where, in the flow from the start of the computation operation to the end of the computation operation, the processing operations from step 1 to step 5 and step 7 shown in FIG. 5 and the processing operations from step 26 to step 34 shown in FIG. 9A are successively performed. FIG. 9B shows pulse waveforms generated on the basis of the data set in the course of the processing operations in this case. The pulse waveforms shown from the top to the bottom in FIG. 9B correspond to cases where the random variable B is set at values "0," "1," "2," and "3," respectively.

The pulse generator 10 included in the switching regulator 6A generates a pulse waveform on the basis of the data obtained through the computation operation of the computing unit 8 and then held by the register unit 9.

Figure 10:
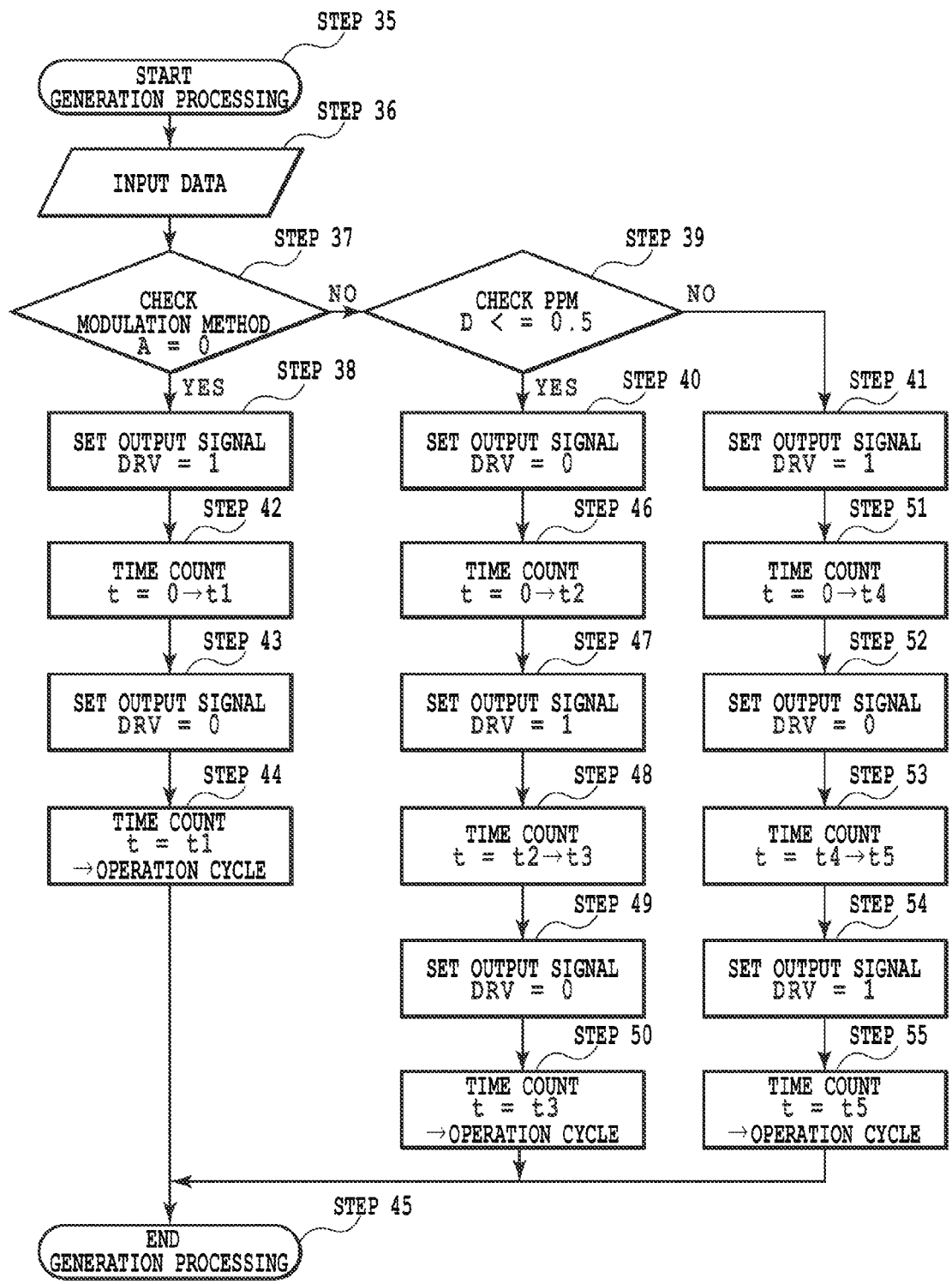
FIG. 10 is a flowchart illustrating a flow of specific processes performed by a pulse-generating unit of the switching regulator according to the invention.
Figure 11:
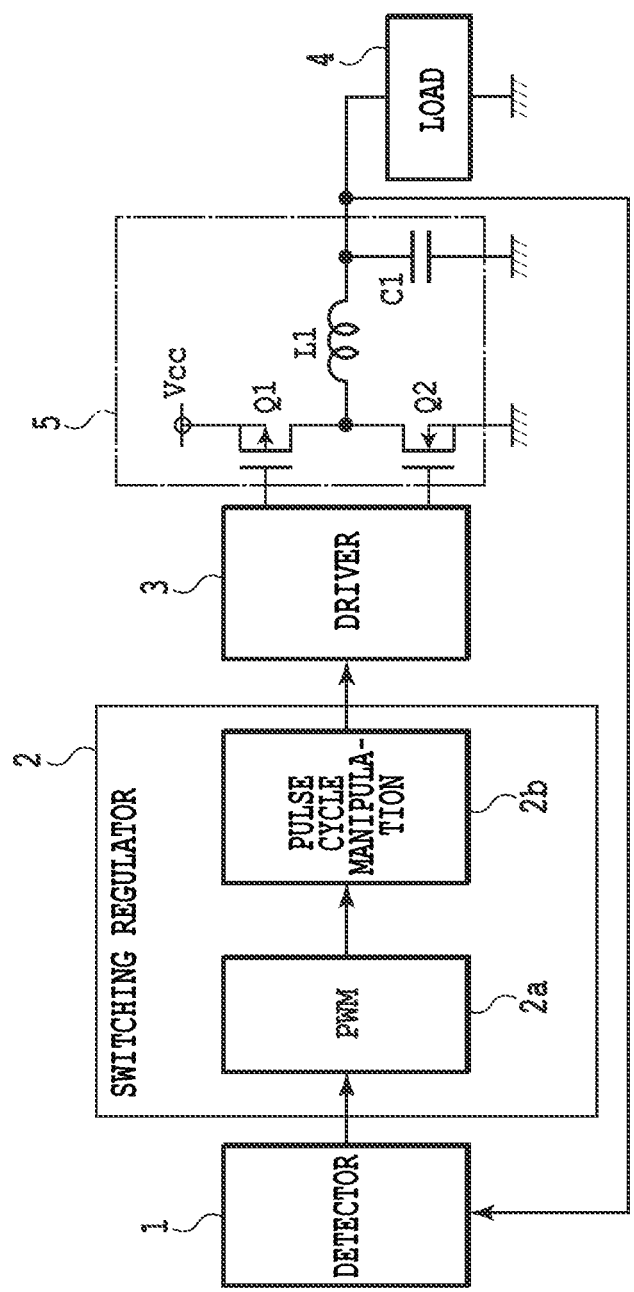
FIG. 11 is a circuit-configuration chart diagram illustrating a switching regulator of a conventional technique and a power-supply apparatus including the switching regulator built therein.
Figure 12A:
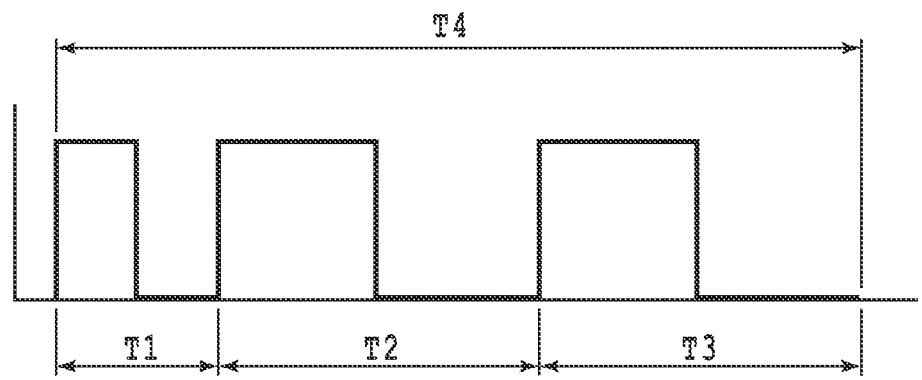
FIG. 12A is a waveform chart illustrating an exemplary waveform pattern formed by a pulse-cycle-manipulation processing performed by a conventional switching regulator.
Figure 12B:
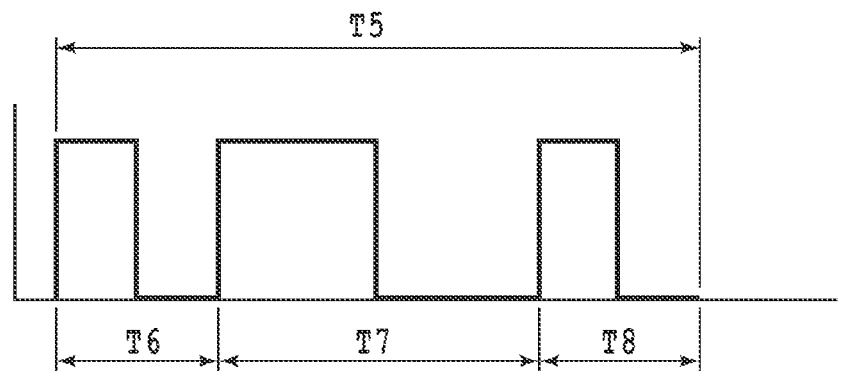
FIG. 12B is a waveform chart illustrating an exemplary waveform pattern formed by a pulse-cycle-manipulation processing performed by a conventional switching regulator.

FIG. 10 shows the flow of specific processing operations performed by the pulse generator 10. Once a processing operation to generate pulse starts at step 35, the data held by the register unit 9 is loaded in a processing operation to input data performed at step 36. After the processing operation to input data, a processing operation to check a modulation method is performed at step 37. The processing operation to check a modulation method branches the flow of processing operations depending on the code of the random variable A included in the loaded data. Specifically, for instance, when the random variable A is "0," the processing operations proceed in the direction of a processing operation to set an output signal performed at step 38. When the random variable A is "1," the processing operations proceed in the direction of a processing operation to check a PPM performed at step 39.

When the processing operations proceed in the direction of the processing operations to check a PPM, the flow of processing operations branches further depending on the duty ratio D. Specifically, when the duty ratio D is 50(%) or lower, the processing operations proceed in the direction of a processing operation to set an output signal performed at step 40. When the duty ratio D is higher than 50(%), the processing operations proceed in the direction of a processing operation to set an output signal performed at step 41.

When the processing proceeds in the direction of the processing operation to set an output signal at step 38 depending on the code of the random variable A, first, the processing operation to set an output signal at step 38 is performed and the output signal DRV is set at "1." In this respect, when the output signal DRV is "1," the pulse waveform is at the high value. In contrast, when the output signal DRV is "0," the pulse waveform is at the low value. After the completion of the processing operation to set an output signal, a processing operation to count time is performed at step 42. In the processing operation to count time, the proceeding to the subsequent processing operation is halted until the time t at zero reaches the standard turn-off time t1.

Once the time t reaches the standard turn-off time t1 in the processing operation to count time performed at step 42, a processing operation to set an output signal is subsequently performed and the output signal DRV is set at "0" at step 43. After the processing operation to set an output signal is performed at step 43, a processing operation to count time is performed. In the processing operation to count time, the proceeding to the subsequent processing operation is halted until the time t at the standard turn-off time t1 reaches the operational cycle. Once the time t reaches the operational cycle in the processing operation to count time performed at step 44, the processing to generate one pulse waveform ends at step 45.

The processing operation to check a modulation method performed at step 37 shown in FIG. 10 corresponds to the processing operation to select a modulation method performed at step 5 shown in FIG. 5. The processing operation to check a PPM performed at step 39 shown in FIG. 10 corresponds to the PPM-selection processing operation performed at step 7 shown in FIG. 5. Accordingly, when the loaded data is the one obtained by executing the ASM processing routine performed at step 6 shown in FIG. 5, the processing operations from step 38 to 44 are performed. With the performance of these processing operations, the pulse outputted by the pulse generator 10 has a shape as shown in FIG. 7B.

Meanwhile, in FIG. 10, when the processing operations proceed in the direction of the processing operation to set an output signal at step 40 depending on the code of the random variable A and the value of the duty ratio D, first, the processing operation to set an output signal at step 40 is performed and the output signal DRV is set at "0." After the processing operation to set an output signal is performed at step 40, a processing operation to count time is performed at step 46, where the proceeding to the subsequent processing operation is halted until the time t at zero reaches the adjusted turn-on time t2. Once the time t reaches the adjusted turn-on time t2 in the processing operation to count time performed at step 46, a processing operation to set an output signal is subsequently performed at step 47 and the output signal DRV is set at "1." After the processing operation to set an output signal is performed at step 47, a processing operation to count time is performed at step 48 and the proceeding to the subsequent processing operation is halted until the time t at the adjusted turn-on time t2 reaches the adjusted turn-off time t3.

Once the time t reaches the adjusted turn-off time t3 in the processing operation to count time performed at step 48, a processing operation to set an output signal is subsequently performed at step 49 and the output signal DRV is set at "0" again. After the processing operation to set an output signal is performed, a processing operation to count time is performed at step 50 and the proceeding to the subsequent processing operation is halted until the time t at the adjusted turn-off time t3 reaches the operational cycle. Once the time t reaches the operational cycle in the processing operation to count time performed at step 50, a processing to generate one pulse waveform is terminated at step 45.

As described earlier, the processing operation to check a modulation method performed at step 37 shown in FIG. 10 corresponds to the processing operation to select a modulation method performed at step 5 shown in FIG. 5, while the processing operation to check a PPM performed at step 39 shown in FIG. 10 corresponds to the PPM-selection processing operation performed at step 7 shown in FIG. 5. Accordingly, when the loaded data is the one obtained by executing the PPM1 processing routine shown in FIG. 8A, the processing operations from step 40 to 50 are performed. With the performance of these processing operations, the waveform of the pulse outputted by the pulse generator 10 has a shape as shown in FIG. 8B.

Meanwhile, in FIG. 10, when the processing operations proceed in the direction of the processing operation to set an output signal at step 41 depending on the code of the random variable A and the value of the duty ratio D, first, the processing operation to set an output signal at step 41 is performed and the output signal DRV is set at "1." After the processing operation to set an output signal is performed, a processing operation to count time is performed at step 51, where the proceeding to the subsequent processing operation is halted until the time t at zero reaches the adjusted turn-off time t4. Once the time t reaches the adjusted turn-off time t4 in the processing operation to count time performed at step 51, a processing operation to set an output signal is subsequently performed at step 52 and the output signal DRV is set at "0." After the processing operation to set an output signal is performed at step 52, a processing operation to count time is performed at step 53, where the proceeding to the subsequent processing operation is halted until the time t at the adjusted turn-off time t4 reaches the adjusted turn-on time t5.

Once the time t reaches the adjusted turn-on time t5 in the processing operation to count time performed at step 53, a processing operation to set an output signal is subsequently performed at step 54 and the output signal DRV is set at "1" again. After the processing operation to set an output signal is performed, a processing operation to count time is performed at step 55, where the proceeding to the subsequent processing operation is halted until the time t at the adjusted turn-on time t5 reaches the operational cycle. Once the time t reaches the operational cycle in the processing operation to count time performed at step 55, processing to generate one pulse waveform is terminated at step 45. Note that, when the loaded data is the one obtained by executing the PPM2 processing routine shown in FIG. 5, the processing operations from step 41 to 55 shown in FIG. 10 are performed. With the performance of these processing operations, the pulse waveform outputted by the pulse generator 10 has a shape as shown in FIG. 9B.

Note that, immediately after completion of the processing to generate one pulse waveform, the processing to generate the next pulse waveform has to start for the purpose of successively generating pulse signals. Accordingly, as long as the switching regulator 6A operates normally, the reaching of the flow of the processing operations to the finish of the generation processing at step 45 in FIG. 10 makes the processing operations unconditionally return to the start of the generation processing at step 35.

In the flow of processing operations performed by the pulse generator 10, it is expected that a certain predetermined time is necessary from the start of the processing to generate a pulse waveform until the performance of the processing operation to set the output signal DRV at the step 38, step 40, or step 41. Here, when the processing proceeds from the start of the generation processing at step 35 to the processing operation to set an output signal at step 38, the necessary time is shorter by the length corresponding to the processing operation to check a PPM at step 39 than the time necessary in the case where the processing proceeds to the processing operation to set an output signal at step 40 or to the processing operation to count time at step 46. If the necessary times have to be equal to each other regardless of the directions among three the processing proceeds, putting a dummy determination processing unit between the processing operation to check a modulation method at step 37 and the processing operation to set an output signal at step 38.

The flow of processing operations performed by the computing unit 8 and the pulse generator 10, both of which are included in the switching regulator 6A of the present invention shown in FIG. 3, is shown in FIGS. 5 and 10. The switching regulator 6A shown in FIG. 1 includes the pulse-width-modulation processing unit (PWM) 2a, and causes the pulse-width-modulation processing unit (PWM) 2a to perform the processing operation to input VFB at step 2 shown in FIG. 5 and the processing operation to set a duty ratio at step 3 shown in FIG. 5. In addition, the portion 2d surrounded by dashed lines in FIG. 1 is a two-step switch changing-over unit. The switch changing-over unit performs the processing operation to set a random variable at step 4 shown in FIG. 5, the processing operation to select a modulation method at step 5 shown in FIG. 5, the proceeding operation to select a PPM at step 7 shown in FIG. 5, the processing operation to check a modulation method at step 37 shown in FIG. 10, and the processing operation to check a PPM at step 39 shown in FIG. 10.

The asynchronous-modulation processing unit (ASM) 2e shown in FIG. 1 performs the ASM processing routine at step 6 shown in FIG. 5, and the processing operations at step 38 and steps 42 to 44 shown in FIG. 10. The first pulse-position-modulation processing unit (PPM1) 2f shown in FIG. 1 performs the PPM1 processing routine at step 8 shown in FIG. 5, and the processing operations at step 40 and steps 46 to 50 shown in FIG. 10. The second pulse-position-modulation processing unit (PPM2) 2g shown in FIG. 1 performs the PPM2 processing routine at step 9 shown in FIG. 5, and the processing operations at step 41 and steps 51 to 55 shown in FIG. 10.

For the switching regulator 6A shown in FIG. 3, the computing time necessary for the asynchronous-modulation processing operation or the pulse-position-modulation processing operation is nonnegligible relative to the cycle of the pulse waveform. For this reason, the computing unit 8 and the pulse generator 10 are provided independently so that the computing unit 8 and the pulse generator 10 can execute processing operations simultaneously. If the computing time necessary for the asynchronous-modulation processing operation or the pulse-position-modulation processing operation is short enough to ignore relative to the cycle of the pulse waveform, the computing unit 8 and the pulse generator 10 do not have to be provided independently. In this case, the pulse generator 10 is not provided and the flow of the processing operations is altered in the following way. The processing operations at step 38 and steps 42 to 44 shown in FIG. 10 are performed at the last of the ASM processing routine performed at step 6 shown in FIG. 5. The processing operations at step 40 and steps 46 to 50 shown in FIG. 10 are performed at the last of the PPM1 processing routine shown in FIG. 8A. The processing operations at step 41 and steps 51 to 55 shown in FIG. 10 are performed at the last of the PPM2 processing routine shown in FIG. 9A.

Figure 13:
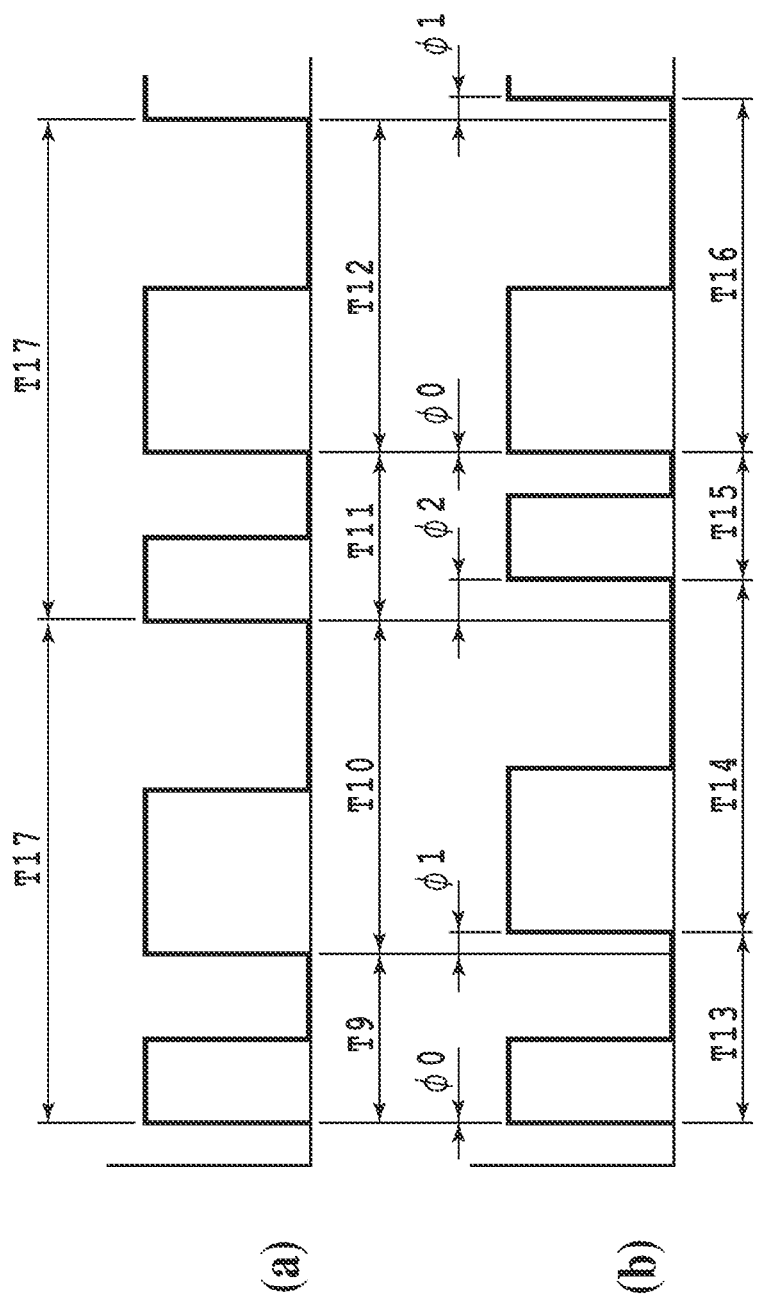
FIG. 13 is a waveform chart illustrating an exemplary waveform pattern obtained when shifting time is added to each turn-on time of each pulse waveform of the conventional technique.
Figure 14:
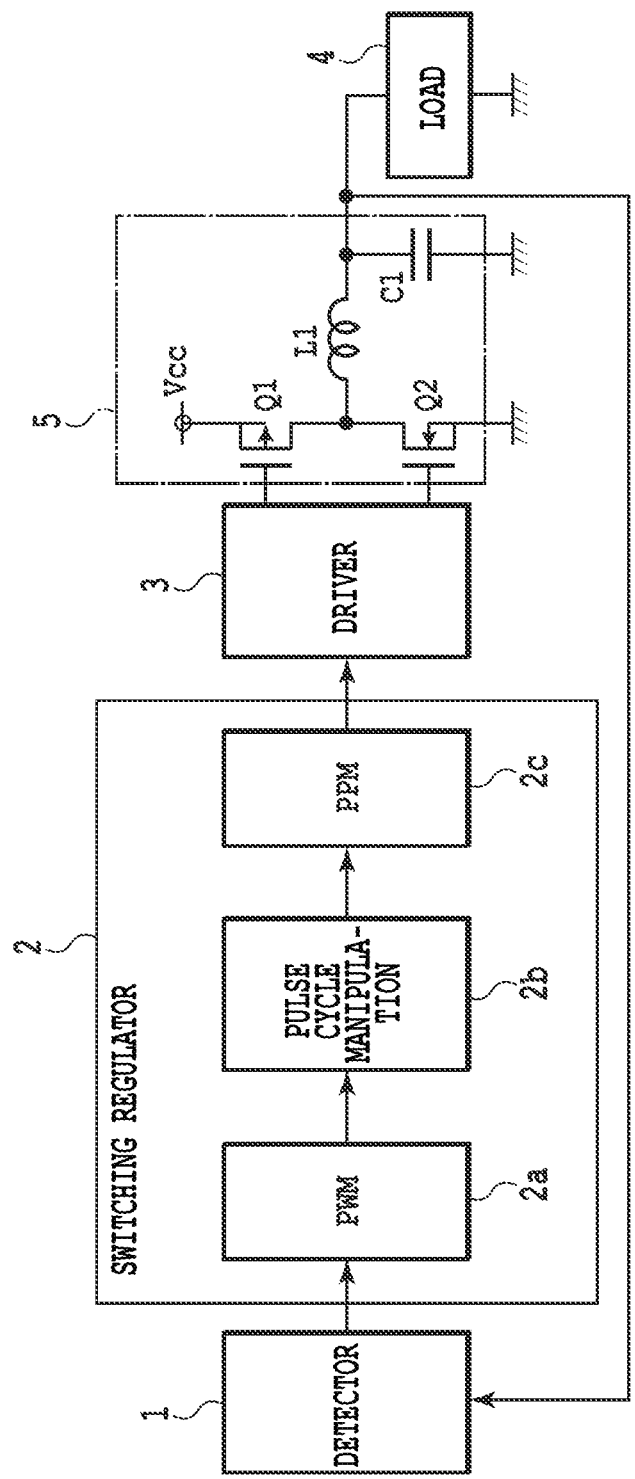
FIG. 14 is a circuit-configuration chart illustrating the configuration of the switching regulator of a conventional technique including an additional configuration for a pulse-position-modulation (PPM) processing to add shifting times.
Figure 15:
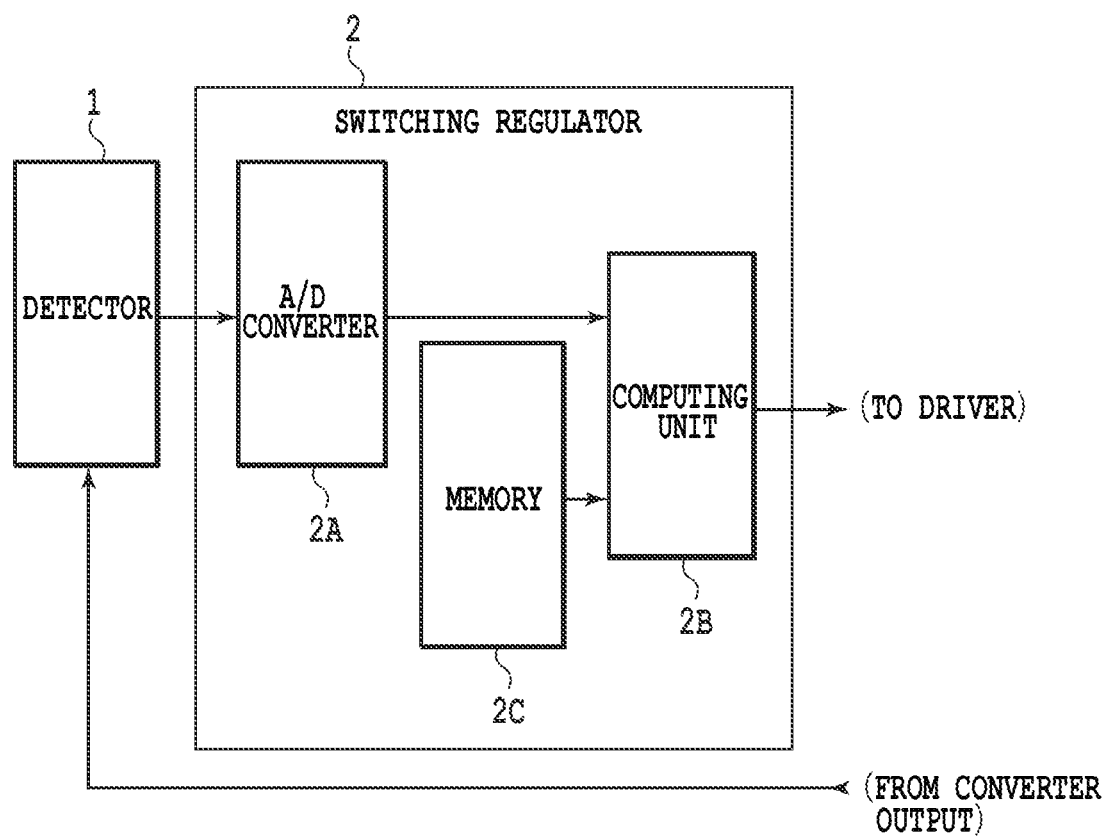
FIG. 15 is a block diagram illustrating an exemplary configuration of the switching regulator of the conventional technique.

The pulse waveforms obtained using the switching regulator 6A of the present invention are pulse waveforms each of which is generated through either an asynchronous-modulation processing or a pulse-position-modulation processing. The pulse waveforms provided by the technique of the present invention can make the maximum shifting time longer and make the variations of settable kinds of shifting times wider than those of the pulse waveforms provided by the conventional technique. Accordingly, the effect to spread the frequency spectrum of the noise of pulse waveforms provided by the invention is as excellent as the effect in the case of the conventionally-provided pulse waveforms shown in FIG. 13(b). Needless to say, unlike the pulse waveforms provided by the conventional technique, the on-duty cycle of the pulse waveforms provided by the technique of the invention is not limited by the shifting time because either the first pulse-position-modulation processing unit (PPM1) or the second pulse-position-modulation processing unit (PPM2) 2g is selectively used by switching from one to the other.

The invention claimed is:

1. A switching regulator with a pulse-width-modulation processing unit that determines a duty ratio of a pulse signal for a switching element depending on an output of the switching element, comprising:
    changing-over unit connected to the pulse-width-modulation processing unit and configured to set any one of a first code and a second code;
    asynchronous-modulation processing unit configured to operate when the changing-over unit sets the first code; and
    first and second pulse-position-modulation processing units configured to operate when the changing-over unit sets the second code,
    wherein the asynchronous-modulation processing unit sets a first operational cycle that is different from a reference cycle to set a first turn-off time for the pulse signal on the basis of the first operational cycle and the duty ratio determined by the pulse-width-modulation processing unit,
    wherein, when the duty ratio is 0% to 50%, both inclusive, the first pulse-position-modulation processing unit sets a second operational cycle that is the same as the reference cycle and a first shifting time for an on-period of the pulse signal to set a second turn-on time and a second turn-off time of the pulse signal on the basis of the operational cycle, the duty ratio, and the first shifting time, and
    wherein, when the duty ratio is 50% exclusive to 100% inclusive, the second pulse-position-modulation processing unit sets the second operational cycle that is the same as the reference cycle and a second shifting time for an off-period of the pulse signal to set a third turn-on time and a third turn-off time of the pulse signal on the basis of the operational cycle, the duty ratio, and the second shifting time.

2. The switching regulator according to claim 1, further comprising:
    a register unit configured to hold, as data for each cycle, the duty ratio, the setting by the changing-over unit, and the first or second operational cycle, as well as the first turn-off time and the second turn-on and turn-off times or the third turn-on and turn-off times; and
    a pulse-generating unit configured to load, for each cycle, the data held in the register unit to generate a pulse waveform based on the data, and to output a pulse signal based on the pulse waveform.

3. The switching regulator according to claim 2, wherein, when the setting by the changing-over unit in the loaded data is the first code, the pulse-generating unit operates to: set a signal level of the pulse waveform at a high value at the start of a cycle; set the signal level at a low value in accordance with the data on the first turn-off time; and terminate the cycle in accordance with the data on the first operational cycle, and
    wherein, when the setting by the changing-over unit is the second code and the duty ratio is 50% or lower, the pulse-generating unit operates to: set a signal level of the pulse waveform at a low value at the start of a cycle; set the signal level at a high value in accordance with the data on the second turn-on time; set the signal level at the low value in accordance with the data on the second turn-off time; and terminate the cycle in accordance with the data on the second operational cycle, and
    wherein, when the setting by the changing-over unit is the second code and the duty ratio exceeds 50%, the pulse-generating unit operates to: set a signal level of the pulse waveform at a high value at the start of a cycle; set the signal level at a low value in accordance with the data on the third turn-off time; set the signal level at the high value in accordance with the data on the third turn-on time; and terminate the cycle in accordance with the data on the second operational cycle.

4. The switching regulator according to claim 3, wherein the first pulse-position-modulation processing unit sets the first shifting time for the on-period randomly and alternatively.

5. The switching regulator according to claim 4, wherein the second pulse-position-modulation processing unit sets the second shifting time for the off-period randomly and alternatively.

6. The switching regulator according to claim 3, wherein the second pulse-position-modulation processing unit sets the second shifting time for the off-period randomly and alternatively.

7. The switching regulator according to claim 2, wherein the first pulse-position-modulation processing unit sets the first shifting time for the on-period randomly and alternatively.

8. The switching regulator according to claim 2, wherein the second pulse-position-modulation processing unit sets the second shifting time for the off-period randomly and alternatively.

9. The switching regulator according to claim 1, wherein the first pulse-position-modulation processing unit sets the first shifting time for the on-period randomly and alternatively.

10. The switching regulator according to claim 1, wherein the second pulse-position-modulation processing unit sets the second shifting time for the off-period randomly and alternatively.

* * * * *

UNITED STATES PATENT AND TRADEMARK OFFICE
CERTIFICATE OF CORRECTION

| | | |
|---|---|---|
| PATENT NO. | : 8,415,938 B2 | Page 1 of 1 |
| APPLICATION NO. | : 12/936119 | |
| DATED | : April 9, 2013 | |
| INVENTOR(S) | : Ibuki Mori et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 401 days.

Signed and Sealed this
Thirteenth Day of May, 2014

Michelle K. Lee
*Deputy Director of the United States Patent and Trademark Office*